(12) United States Patent
Adachi

(10) Patent No.: US 6,906,841 B2
(45) Date of Patent: Jun. 14, 2005

US006906841B2

(54) COLOR FILTER SUBSTRATE AS WELL AS METHOD OF MANUFACTURING THE SAME, ELECTRO-OPTIC DEVICE AND ELECTRONIC EQUIPMENT

(75) Inventor: Isao Adachi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/609,643

(22) Filed: Jul. 1, 2003

(65) Prior Publication Data

US 2004/0036945 A1 Feb. 26, 2004

(30) Foreign Application Priority Data

Jul. 9, 2002 (JP) .................................. 2002-200410

(51) Int. Cl.[7] .............................. G02F 1/33; G09G 3/36
(52) U.S. Cl. .................................... 359/245; 359/253
(58) Field of Search ................................ 359/245, 253, 359/266; 349/106; 362/293

(56) References Cited

U.S. PATENT DOCUMENTS 6,215,538 B1 * 4/2001 Narutaki et al. ............ 349/106
6,624,860 B1 * 9/2003 Narutaki et al. ............ 349/106
6,697,135 B1 * 2/2004 Baek et al. ................. 349/106

FOREIGN PATENT DOCUMENTS

JP    A 11-44814    2/1999
JP    A 11-242226   9/1999

* cited by examiner

Primary Examiner—Scott J. Sugarman
Assistant Examiner—Richard Hanig
(74) Attorney, Agent, or Firm—Oliff & Berridge

(57) ABSTRACT

The invention provides a color filter substrate in which light leakage ascribable to the gap of colored layers, etc. are reduced or prevented from occurring, and which is capable of displaying a color image of high quality, and a method of manufacturing the same. A color filter substrate which has pixel portions arrayed in the shape of a matrix on a substrate includes a first colored layer which is formed at parts in either of a transmission region and a reflection region adjacent to each other within each of the pixel portions, and a second colored layer which is formed in both the regions and on the whole surfaces thereof except the formation region of the first colored layer.

13 Claims, 18 Drawing Sheets

COLOR FILTER SUBSTRATE AS WELL AS METHOD OF MANUFACTURING THE SAME, ELECTRO-OPTIC DEVICE AND ELECTRONIC EQUIPMENT

BACKGROUND OF THE INVENTION

1. Field of Invention

The present invention relates to a color filter substrate as well as a method of manufacturing the same, and an electro-optic device. The present invention also relates to electronic equipment having an electro-optic device.

2. Description of Related Art

A related art electro-optic device, such as a liquid crystal device, is of a reflection/semitransmission type, where both a reflection type display utilizing external light and a transmission type display utilizing the illumination light of a backlighting unit or the like are made visible. By way of example, the electro-optic device is constructed on a substrate constituting this electro-optic device, out of a reflection layer, apertures formed in the reflection layer, a light source, such as the backlighting unit disposed under the apertures, etc. With such a construction, the external light having entered into a light entrance surface on the substrate is reflected by the reflection layer to arrive at and exit from the light entrance surface again, while the illumination light emitted from the light source arrives at and exits from the light entrance surface through the interior of the substrate and the aperture. Thus, when the exiting light of the former is utilized, it is permitted to present the reflection type display, and when the exiting light of the latter is utilized, it is permitted to present the transmission type display. Usually, the aperture is preferably provided for every pixel.

In this case, colored layers (constituting a "color filter") which include layers of three primary colors independent of one another, for example, R (red), G (green) and B (blue), are sometimes formed on each of the reflection layer and the apertures.

Due to the existence of the colored layers, any of the light undergoing the reflection from the reflection layer, etc. or the light emitted from the light source is transmitted through the colored layers before exiting from the light entrance surface. That is, with such a construction, color display become possible in both the reflection type display and the transmission type display.

In case of presenting the color displays on the basis of the principle as stated above, however, when the colored layers are formed in quite the same aspect for an aperture region (that is, a region for use in a transmission type display mode, or a transmission region) and for a reflection layer region (that is, a region for use in a reflection type display mode, or a reflection region) except the aperture region, images of different impressions are displayed between in the reflection type display and the transmission type display. The reason therefor is that the light which is utilized to present the reflection type display traces a path (hereinbelow "reflection path") along which it enters into the light entrance surface on the substrate, arrives at the reflection layer and retrogresses therefrom to the light entrance surface again, so it proceeds through the colored layers overlying the reflection layer and back, thereby to be "transmitted through the colored layers twice", whereas the light which is utilized to present the transmission type display traces a path (hereinbelow "transmission path") along which it is emitted from the light source and arrives at the light entrance surface through the interior of the substrate and the aperture, so it is transmitted through the colored layers overlying the aperture, once. In general, accordingly, the reflection type display affords a "deeper" color display as compared with the transmission type display.

In the related art, in order to cope with such a drawback, colored layers of different color purities have been formed in the aperture region and the reflection layer region except this aperture region. More concretely, regarding the respective colors RGB, colored layers of inferior spectral transmission characteristic are formed for the former region, and colored layers of superior spectral transmission characteristic are formed for the latter region. The degree of the difference between the superior and inferior characteristics can be determined in consideration of the difference between the path lengths of the reflection path and the transmission path. With this contrivance, color image displays giving substantially the same impressions can be presented in the reflection type display and the transmission type display. A related art technique is disclosed in JP-A-11-242226, for example.

SUMMARY OF THE INVENTION

In the electro-optic device including such colored layers, however, there has been a problem as stated below. In a case where, as explained above, the colored layers of different color purities are respectively formed for the aperture region and for the reflection layer region except this aperture region, two times of photolithographic processes in total are usually performed in such a way that, after the colored layers for the aperture region have been formed by photolithography, the colored layers different from the foregoing, for the reflection layer region except the aperture region are formed similarly by photolithography. With such photolithographic processes, however, misalignment at exposure to light, etc. may occur. On this occasion, it is difficult to form the different colored layers so as to completely cover only the aperture region and the reflection layer region except this aperture region.

More concretely, a "gap" or an "overlap", for example, may occur on the boundary line between the colored layers on the aperture region and the colored layers on the reflection layer region. In a case where the former or "gap" occurs, the colored layers do not exist at the part of the gap, and in a case where the latter or "overlap" occurs, the thick colored layers exist at the part of the overlap. Accordingly, notwithstanding that the color display ought to be presented on the entire image, monotonous displays in white, black or the like appear at places because of light leakage, light shield or the like ascribable to the gaps or the overlaps. That is, the quality of the image is degraded.

The present invention addresses the above and/or other problems, and provides a color filter substrate in which light leakage ascribable to the gap of colored layers, etc. is reduced or prevented from occurring, and which is capable of displaying a color image of high quality, as well as a method of manufacturing the color filter substrate, and an electro-optic device of a reflection/semitransmission type which includes the color filter substrate. The present invention also provides an electronic equipment which includes the electro-optic device as stated above.

In order to address or accomplish the above, a color filter substrate according to the present invention includes: a color filter substrate which has pixel portions arrayed in the shape of a matrix on a substrate; a first colored layer which is formed at parts in either of a first region and a second region adjacent to each other within each of the pixel portions; and a second colored layer which is formed in both the first region and the second region and on whole surfaces thereof except a formation region of the first colored layer.

According to the color filter substrate of the present invention, pixel portions arrayed in the shape of a matrix on a substrate are included. Such a color filter substrate can construct one of a pair of substrates constituting a liquid crystal device which is an example of an electro-optic device as is exemplified in detail more concretely below. In this case, by way of example, a color image display can be presented in such a way that light transmitted through a first region constituting each pixel portion, or light reflected from a second region constituting each pixel portion is further transmitted through a liquid crystal and a colored layer.

In the present invention, the first region and the second region which are adjacent to each other in the pixel portion are especially existent. The first region and the second region termed here can be preferably be supposed as a transmission region transmitting light and a reflection region reflecting light as stated above, respectively. More concretely, in such a case where a reflection electrode forming the whole surface of the pixel portion is disposed and where an aperture exists at part of the reflection electrode, the region of the aperture can be supposed as the second region being the transmission region, and the formation region of the reflection electrode except the aperture can be supposed as the first region being the reflection region (Of course, the converse supposition is possible).

In the present invention also includes a first colored layer which is formed at parts in the above transmission region (or reflection region), and a second colored layer which is formed in both the transmission region and the reflection region and on the whole surfaces thereof except the formation region of the first colored layer. That is, in this case, the second colored layer exists on the whole surface in the reflection region, while the first colored layer formed at the parts and the second colored layer formed in the remaining region coexist in the transmission region. Here, if an appropriate color purity difference exists between the first colored layer and the second colored layer, an appropriate color purity difference can be set also between the reflection region and the transmission region. The reason therefor is that a proper color mixture between the first colored layer and the second colored layer is realized in the transmission region, whereby the color purity difference can be produced also between the reflection region and the transmission region. Incidentally, the degree of the color mixture between the first colored layer and the second colored layer can be adjusted in accordance with the ratio between the whole area of the first colored layer in the first region and the whole area of the second colored layer. For the above reasons, according to the present invention, first of all, it is permitted to avoid the occurrence of the situation where, as stated with regard to the related art, the impressions of images differ between a reflection type display and a transmission type display.

Moreover, in the present invention, the second colored layer is formed on the whole surfaces in both the reflection region and the transmission region, so that the drawback as stated with regard to the related art does not occur regarding both the regions. That is, in the present invention, the second colored layer exists between the first region and the second region, so that a "gap", an "overlap" or the like is not developed between the colored layer formed on the transmission region and the colored layer formed on the reflection region, as in the prior art.

In this manner, according to the present invention, the appropriate color purity difference can be set between the first region and the second region, and none of the "gap", the "overlap", etc. is developed between the colored layers formed on both the regions. It is therefore possible to avoid such a situation that the quality of a color image is degraded by light leakage, light shield, or the like ascribable to the gap, the overlap, or the like.

The "partial formation" termed in the present invention signifies all cases where the first colored layer is not formed on the whole surface of the first region. Concretely, an aspect in which the first colored layer is formed in the shape of a matrix as will be stated later, etc. are favorable, but there are also included, for example, an aspect in which the first colored layer is formed so as to demonstrate a checkered pattern in the first region, and an aspect in which the first colored layer is formed in the shape of stripes.

In one aspect of the color filter substrate of the present invention, the first colored layer is formed in a matrix-like pattern within the first region.

According to this aspect, within the first region, the second colored layer is formed so as to fill up the matrix-like gaps of the first colored layer formed in the shape of a matrix. That is, the color mixture between the two colored layers is realized in a more preferable condition, so that the setting of the color purity difference between the first region and the second region can be realized more preferably. Individual shapes constituting the matrix-like pattern may be all the same or may well be different. Each of the individual shapes may basically be any shape including a polygonal shape such as triangle or quadrilateral, or a circular shape.

In another aspect of the color filter substrate of the present invention, a predetermined distance is set between an outer edge of the region in which the first colored layer is formed and an inner edge of the either region.

According to this aspect, the predetermined distance is set between the outer edge of the region (hereinbelow "first-colored-layer formation region") in which the first colored layer is formed and the inner edge of the either region (hereinbelow "first region"). In other words, the first colored layer is formed so as not to exist along the inner edge of the first region.

In this aspect, a functional effect as stated below is obtained due to this fact. In a case where the first colored layer is formed by, for example, photolithography, a raw material film to become the first colored layer and a resist film having a predetermined pattern and formed on the raw material film are formed, and both of them are thereafter subjected to the steps of etching (refer to the description of a "manufacturing method" below). In this case, in order to shape the resist film into the predetermined pattern, an exposure step employing a projection aligner is carried out. At the exposure step employing the projection aligner, however, so-called "misalignment" occurs in some cases. When such misalignment has occurred, it is considered in a bad case that, although the predetermined pattern ought to be confined within the range of the first region, it extends into the second region. That is, in this case, the first colored layer is entirely or partly formed even in the second region.

In contrast, in this aspect, as stated above, the predetermined distance is set between the outer edge of the first-colored-layer formation region and the inner edge of the first region (or, a boundary line in a case where the inner edge lies in contact with the second region), whereby even when the misalignment as stated above has occurred, it is absorbed by the predetermined distance. It is therefore permitted to prevent such a situation that the first colored layer is formed outside the first region or inside the second region.

In this aspect, when the predetermined distance is set between the outer edge of the first-colored-layer formation region and the inner edge of the first region, the functional effect as stated above can be obtained. As understood from the example stated above, however, when the predetermined distance as stated before is set, at least, between the outer edge of the first-colored-layer formation region and the boundary line of the first region and the second region, it is possible to avoid the most unfavorable situation of the color development of the first colored layer in the second region.

Besides, the concrete value of the "predetermined distance" termed in this aspect depends greatly upon the performance of the projection aligner, etc. though the magnitude of the misalignment is also influential. In this aspect, in consideration of such circumstances, the concrete value of the "predetermined distance" can be occasionally and appropriately determined experimentally, empirically, theoretically or by simulation or the like.

In another aspect of the color filter substrate of the present invention, a thickness of the first colored layer and that of the second colored layer are the same.

According to this aspect, the thicknesses of the first colored layer and second colored layer are made the same, and hence, it is possible to lower the possibility of the occurrence of any defect on an image display as can arise in a case, for example, where a level difference exists due to the difference of the thicknesses between both the layers.

The "same" termed in this aspect includes a case where the thicknesses of the first colored layer and second colored layer are quite identical, and a case where they are somewhat different. This is because, even in the latter case, that range of the magnitudes of the "level difference" within which the functional effect stated above can be satisfactorily enjoyed is existent.

In another aspect of the color filter substrate of the present invention, the first colored layer and the second colored layer are made of materials which have spectral transmission factors different from each other.

According to this aspect, the color mixture in the first region can be appropriately realized as stated above, whereby also the setting of the color purity difference between the first region and the second region can be appropriately realized.

In order to address or accomplish advantages, the electro-optic device of the present invention includes the color filter substrate of the present invention as stated above (including any of the various aspects thereof); another substrate which is arranged in opposition to the color filter substrate; and an electro-optic substance which is arranged between the color filter substrate and the other substrate.

According to the electro-optic device of the present invention, the color filter substrate of the present invention as stated above is included, and it is therefore permitted to provide an electro-optic device which is capable of color image displays without a sense of incompatibility, between the image display in the mode of utilizing reflected light and the image display in the mode of utilizing transmitted light.

As the "electro-optic device" termed in the present invention, there can be considered, for example, one including a first substrate and a second substrate which are arranged in opposition so as to sandwich a liquid crystal or the like electro-optic substance therebetween, first wiring lines which are laid on at least one of the first and second substrates so as to extend in a fixed direction, second wiring lines which are laid on at least either of the first and second substrates and which extend in a direction intersecting with the first wiring lines, pixel electrodes and switching elements such as thin film diodes (TFDs) and thin film transistors (TFTs), which are formed so as to correspond to the intersection regions of the first and second wiring lines. According to such an electro-optic device, so-called "active matrix drive" becomes possible. Here in this case, if the first wiring lines, second wiring lines, pixel electrodes and switching elements are all formed on the "first substrate" by way of example, it can be generally considered that the "first substrate" corresponds to the "other substrate" termed in the present invention, while the "second substrate" corresponds to the "color filter substrate" according to the present invention. In this case, the second substrate is further overlaid with a common electrode, etc. over the whole surface thereof. In the above example, however, there can also be a structure in which the "other substrate" and the "second substrate", and the "color filter substrate" and the "first substrate" correspond, respectively.

Also, as the "electro-optic device" termed in the present invention, there can be considered another one including a first substrate which includes stripe-shaped first electrodes extending in a fixed direction, a second substrate which includes stripe-shaped second electrodes extending in a direction intersecting with the first electrodes, and an electro-optic substance, such as liquid crystal, which is sandwiched between the first substrate and the second substrate. According to such an electro-optic device, so-called "passive matrix drive" becomes possible. Here in this case, it can be considered that either the "first substrate" or the "second substrate" corresponds to the "other substrate" termed in the present invention, and it can accordingly be considered that either the "second substrate" or the "first substrate" corresponds to the "color filter substrate".

Further, a liquid crystal in which a plurality of sorts of nematic liquid crystals are mixed, or the like corresponds typically to the "electro-optic substance" termed in the present invention, though it can be altered depending upon the constructions of the other substrate, etc. Alternatively, in some cases, powdery EL (Electroluminescence) dispersed in a suitable binder, or inorganic or organic EL, for example, corresponds to the "electro-optic substance" termed in the present invention.

In order to address or accomplish advantages, the method of the present invention for manufacturing a color filter substrate includes a method of manufacturing a color filter substrate which has pixel portions arrayed in the shape of a matrix on a substrate. The method includes: forming a first colored layer at parts in either of a first region and a second region which are adjacent to each other within each of the pixel portions; and forming a second colored layer in both the first region and the second region and on whole surfaces thereof except a formation region of the first colored layer.

According to the method of the present invention for manufacturing a color filter substrate, the color filter substrate of the present invention as stated above can be appropriately manufactured.

More concretely, in one aspect of the method of the present invention for manufacturing a color filter substrate, the forming of the first colored layer further includes: forming a first raw material film on a whole surface of the each pixel portion; forming a resist film on the first raw material film; subjecting the resist film to exposure to light for a predetermined pattern, and developing an exposed region of the resist film; and etching both the resist film and the first raw material film.

According to this aspect, the first colored layer is formed by so-called "photolithography". Thus, it is permitted to perform the formation of the first colored layer more easily and more accurately.

By the way, in the present invention, the first colored layer and the second colored layer may well be sometimes formed by an expedient other than the above photolithography. It is also possible to adopt, for example, a method in which a suitable colored ink material with a pigment or a dye dispersed therein is applied/printed by employing an ink jet printer.

Further, in another aspect of the method of the present invention for manufacturing a color filter substrate, the forming of the second colored layer includes: forming a second raw material film which has a thickness greater than that of the second colored layer to be finally formed; and baking the second raw material film.

According to this aspect, it is permitted to make substantially the same the thicknesses of the first colored layer and the second colored layer which are finally formed. More specifically, in this aspect, in the first place, the second raw material film whose thickness is greater than the thickness of the second colored layer to be finally formed is formed, and secondly, such a second raw material film is baked. At the succeeding step of baking, usually so-called "film decrease" occurs. Therefore, when the thickness of the second raw material film is appropriately set at the preceding step of forming the raw material film, the thicknesses of the first colored layer and the second colored layer can be made substantially the same.

Thus, in this aspect, it is possible to lower the possibility of giving rise to any defect on an image display as can occur in a case where a level difference exists due to the difference of the thicknesses between both the layers.

By the way, in the above, "substantially the same" includes a case where the thicknesses of the first colored layer and second colored layer are quite identical, and a case where they are somewhat different. This is because, even in the latter case, that range of the magnitudes of the "level difference" within which the functional effect stated above can be satisfactorily enjoyed is existent. How much the thickness of the second raw material film is to be made greater than that of the second colored layer to be finally formed, can be determined by the extent of the film decrease based on the baking step. It can be occasionally and appropriately determined experimentally, empirically, theoretically or by simulation.

Further, in forming the second colored layer as stated above, in addition to the above steps, an aspect utilizing photolithography may be used as in the description concerning the first colored layer.

In another aspect of the method of the present invention for manufacturing a color filter substrate, the predetermined pattern includes a matrix-like pattern at parts corresponding to the first region.

According to this aspect, the first colored layer in the first region can be photolithographically formed as, for example, the matrix-like pattern in which a plurality of shapes identical to one another are arrayed. Thus, in the first region, the second colored layer is formed so as to fill up the matrix-like gaps of the first colored layer formed in the shape of a matrix. That is, the color mixture between the two colored layers is realized in a more favorable condition, so that the setting of the color purity difference between the first region and the second region can be realized more favorably. Individual shapes constituting the matrix-like pattern may be all identical or may well be different.

In this aspect, it is especially recommended that a total of areas of individual shapes constituting the matrix-like pattern is smaller than an area of a part within the matrix-like pattern except the individual shapes.

According to such a construction, each of the areas of the individual shapes constituting the matrix-like pattern is comparatively small. The reason therefor is that, as stated above, the area of the part of the matrix-like pattern forming, so to speak, the background thereof is larger than the total of the areas of the other parts (that is, the total of the areas of the individual shapes). Thus, it is permitted to lower the possibility that the resist film will be left on the first raw material film at the photolithographic step stated above. That is, according to this aspect, such a situation can be prevented that the resist film remains on the first colored layer, so a color different from an original color display is displayed.

Although this construction is restricted as mentioned above, the purpose to be attained by this construction is to finally manufacture the color filter substrate in a state where the resist film does not remain, as stated above. Accordingly, it can be more directly the that the "individual shapes include a shape difficult to leave the resist film". The above aspect in which the total area of the individual shapes becomes comparatively small, is one suitable aspect in the case where the "resist film is difficult to remain". Conversely speaking, in a case where the "individual shape" is a shape which is considered to easily leave the resist film, for example, a mere oblong which has a comparatively large area, the adoption of such a shape is unfavorable from the above viewpoint. In this aspect, accordingly, at least such a shape is excluded.

In another aspect of the method of the present invention for manufacturing a color filter substrate, a predetermined distance is set between an outer edge of a region where the first colored layer is formed and an inner edge of the first region.

According to this aspect, even when so-called "misalignment" has occurred at the exposure step stated above, such a situation can be avoided that the first colored layer is formed extending into the second region. The reason therefor is that the predetermined distance is set between the outer edge of the first-colored-layer formation region and the inner edge of the first region, so even when the misalignment as mentioned above has appeared, it is absorbed by the predetermined distance.

In order to address or accomplish advantages, the electronic equipment of the present invention includes the electro-optic device of the present invention as stated above.

The electronic equipment of the present invention includes the electro-optic device of the present invention. It is therefore possible to realize various electronic equipment, such as a projection type display device, a liquid-crystal television receiver, a portable telephone set, an electronic notebook, a word processor, a video tape recorder of view finder type or monitor direct-view type, a workstation, a video telephone set, a POS terminal, and a touch panel, for example, which are capable of displaying color images of high quality free from light leakage, light shield, etc. ascribable to the gap and overlap between the first colored layer and the second colored layer.

Such functions and other advantages of the present invention will be apparent from the following mode for carrying out the invention.

DETAILED DESCRIPTION OF PREFERRED EMBODIMENTS

Exemplary embodiments of the present invention are described below with reference to the drawings. The exemplary embodiments are described such that the electro-optic device of the present invention is applied to a liquid crystal device. (Constructions of Color Filter Substrate and Electro-Optic Device)

Figure 1:
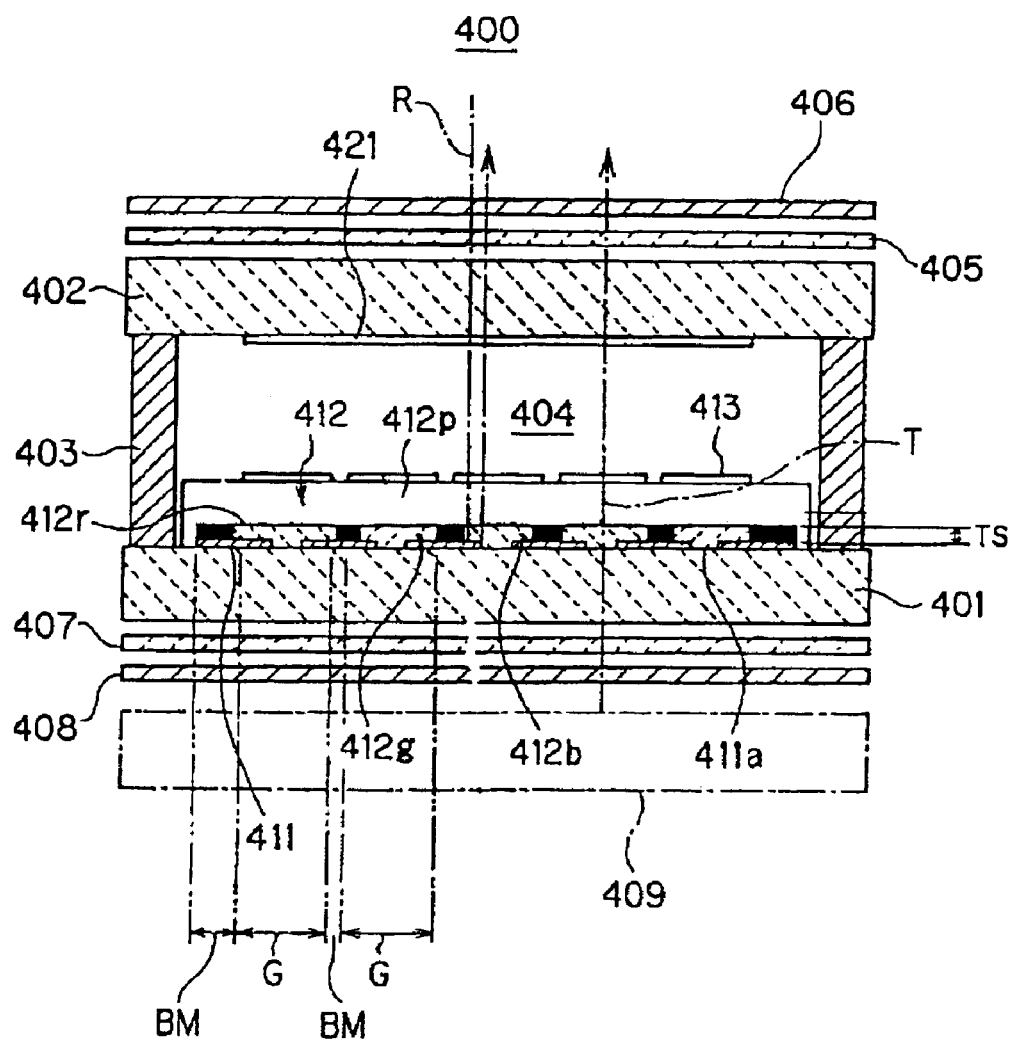
FIG. 1 is a schematic sectional view showing the structure of a liquid-crystal display panel according to an exemplary embodiment of the present invention.
Figure 2:
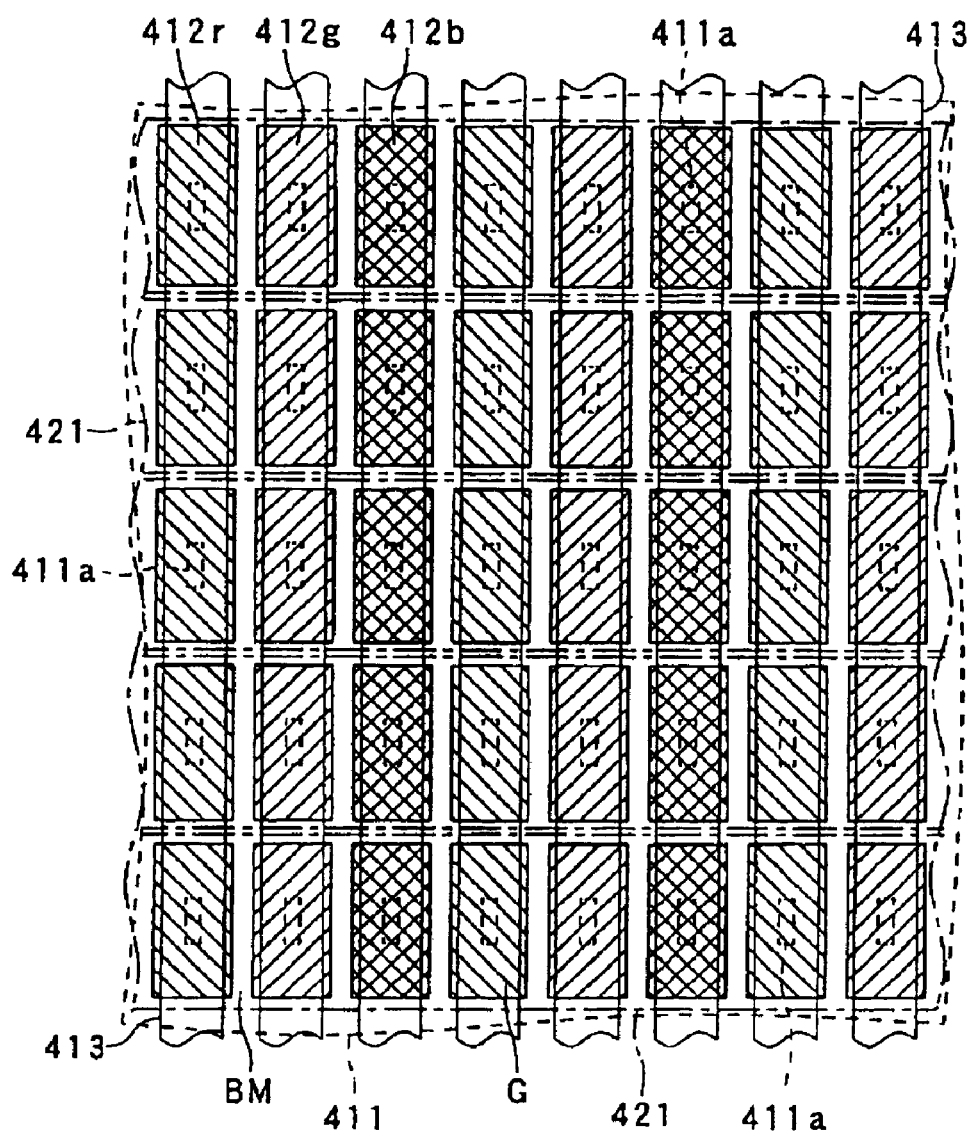
FIG. 2 is a schematic plan view showing the structure of a color filter substrate shown in FIG. 1.
Figure 3:
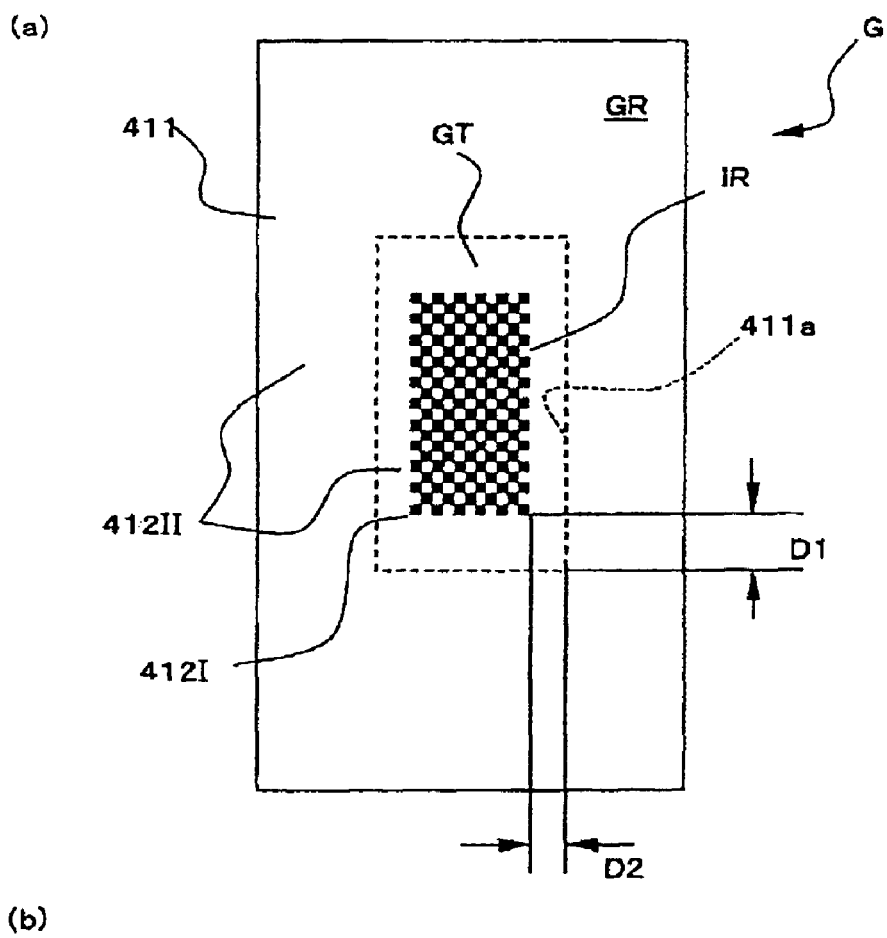
FIGS. 3(a) and 3(b) are plan views showing the formation aspect of a first colored layer and a second colored layer on a transmission region and a reflection region within a pixel according to this exemplary embodiment.
Figure 3:
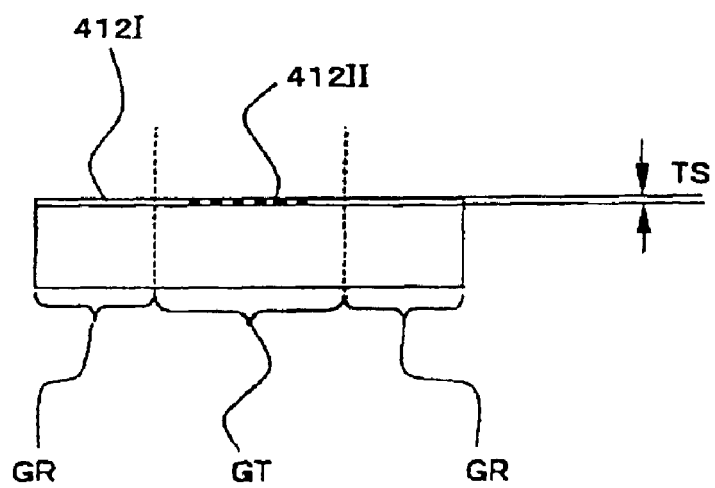

First, an exemplary embodiment according to the present invention is described below with reference to FIGS. 1 through 3(b). FIG. 1 is a schematic sectional view showing in model fashion a color filter substrate according to this exemplary embodiment and a liquid-crystal display panel 400 which is one example of an electro-optic device employing the color filter substrate, while FIG. 2 is a schematic plan view showing in model fashion the plan structure of the color filter substrate which is shown in FIG. 1. FIGS. 3(a) and 3(b) are schematics that only show the structure of one pixel in the plan structure shown in FIG. 2, where FIG. 3(a) is a plan view, while FIG. 3(b) is a sectional view.

Referring to FIG. 1, the liquid-crystal display panel 400 is so constructed that a first substrate 401 and a second substrate 402 made of glass, plastics or the like are stuck to each other through a sealant 403, and that a liquid crystal 404 is tightly enclosed in the interior. A reflection layer 411 in which an aperture 411a is formed every pixel is formed on the inner surface of the first substrate 401 being one example of the color filter substrate, and a color filter 412 which includes colored layers 412r, 412g and 412b and a protective film 412p is formed on the reflection layer 411 (as is referred to below).

On the other hand, stripe-shaped transparent electrodes 421 are formed on the inner surface of the second substrate 402, and they are constructed so as to intersect with similarly stripe-shaped transparent electrodes 413 which are formed on the surface of the protective film 412p on the opposing first substrate 401. Thus, the liquid-crystal display panel 400 according to this exemplary embodiment is capable of so-called "passive matrix drive". Such transparent electrodes 413 and transparent electrodes 421 on the respective substrates 401 and 402 are overlaid with orientation films, hard transparent films, etc. properly as may be needed.

A phase difference plate (quarter-wavelength plate) 405 and a polarizer plate 406 are successively arranged over the outer surface (in the figure, upper side) of the second substrate 402, while a phase difference plate 407 and a polarizer plate 408 are successively arranged over the outer surface (in the figure, lower side) of the substrate 401.

In this exemplary embodiment, the reflection layer 411 which is about 50–250 nm thick and which, has the apertures 411a is formed on the inner surface of the first substrate 401. This reflection layer 411 can be formed of a thin film of aluminum, an aluminum alloy, a silver alloy, or the like. The aperture 411a is formed so as to have a predetermined opening rate (for example, 10–30%) with respect to the whole area of each of the pixels G which are arrayed in the shape of a matrix vertically and laterally along the inner surface of the substrate 401. One opening 411a may be formed every pixel G as shown in FIG. 2 which is the plan view with the substrate 401 seen from above, but a plurality of apertures may well be provided every pixel. The "pixel G" in this exemplary embodiment signifies one set of various constituents such as the basic constituents including parts of the transparent electrodes 413 and 421 in the intersection region between one certain transparent electrode 413 and one certain transparent electrode 421 as shown in FIGS. 1 and 2, and the liquid crystal 404 located in the intersection region, and the other constituents including the reflection layer 411 as well as the aperture 411a and the colored layer 412r, 412g or 412b.

Black masks BM are formed between the pixels G in order to separate the respectively adjacent pixels G and to reduce or prevent light from mixing from one pixel into the other pixel. Usable for the black masks BM is a black resin material, for example, a resin in which a black pigment is dispersed.

In case of the color filter of, for example, primary color system, the colored layers 412r, 412g and 412b which include the three colors of R (red), G (green) and B (blue) and each of which is about 0.5–2.0 μm thick are formed on the reflection layer 411. As shown in FIG. 2 by way of example, the colored layers 412r, 412g and 412b of the corresponding colors are respectively arrayed in the shape of stripes for the pixels G arrayed in the shape of the matrix. Alternatively, however, an appropriate array aspect, such as related art or known delta (triangular) array or slant mosaic (diagonal) array may well be adopted every pixel G.

The protective film 412p made of a transparent resin or the like is formed on the colored layers 412r, 412g and 412b and the black masks BM. This protective film 412p has the function of protecting the colored layers 412r, 412g and 412b from corrosion and contamination ascribable to chemicals etc. which are used in the manufacturing process of the color filter substrate or the liquid-crystal display panel 400 according to this exemplary embodiment. Further, considering a case where an overlapped mask layer (that is, a layer in which the colored layers of the respective colors are overlapped, thereby to be tinged with black, and which therefore has a light shield function) is formed instead of the black mask layer BM, level differences which are not shown in FIG. 1 appear between the surface of the overlapped mask layer and the surfaces of the colored layers 412r, 412g and 412b. The protective film 412p has also the function of concealing such level differences and flattening its surface.

In such a liquid-crystal display panel 400, it is possible to present a reflection type display and a transmission type display. More specifically, in case of presenting the reflection type display, light having entered into the liquid crystal 404 from the upper surface of the second substrate 402 as viewed in the figure is reflected on the reflection layer 411, it is transmitted within the liquid crystal 404 again, and it exits from the upper surface of the second substrate 402 (refer to a reflection path R indicated in FIG. 1), so that a viewer views the exiting light as an image. Besides, in case of presenting the transmission type display, light emitted from a backlighting unit 409 which is disposed at a lower position in the figure passes through the apertures 411a, it is transmitted within the liquid crystal 404, and it exists from the upper surface of the second substrate 402 (refer to a transmission path T indicated in FIG. 1), so that the viewer views the exiting light as an image.

In this case, in this exemplary embodiment, color image displays can be presented in both the reflection type display and the transmission type display for the reason that the colored layers 412r, 412g and 412b are formed on the reflection layer 411 and its apertures 411a. However, in the case of presenting the reflection type display, the light traces the reflection path R in FIG. 1, thereby to be transmitted through the colored layers 412r, 412g and 412b twice in total, whereas in the case of presenting the transmission type display, the light traces the transmission path T in FIG. 1, thereby to be transmitted through the colored layers 412r, 412g and 412b only once. Accordingly, assuming that the constructions of the colored layers 412r, 412g and 412b be quite the same on the reflection layer 411 and its apertures 411a, a color image based on the reflection type display and one based on the transmission type display give different impressions.

In this exemplary embodiment, therefore, the colored layers 412r, 412g and 412b for the respective pixels G are especially formed in an aspect as shown in FIGS. 3(a) and 3(b). Referring to FIGS. 3(a) and 3(b), in one pixel G, a reflection region GR corresponding to a region where the reflection layer 411 is formed, and a transmission region GT corresponding to a region where the aperture 411a is formed exist so as to be adjacent to each other. Herein, a first colored layer 412I (blackened parts in FIGS. 3(a) and 3(b)) is formed at parts in the transmission region GT, and a second colored layer 412II (whitened parts in FIGS. 3(a) and 3(b)) is formed in the reflection region GR, and the transmission region GT except a region IR where the first colored layer 412I is formed (hereinbelow, termed "first-colored-layer formation region IR").

Figure 4:
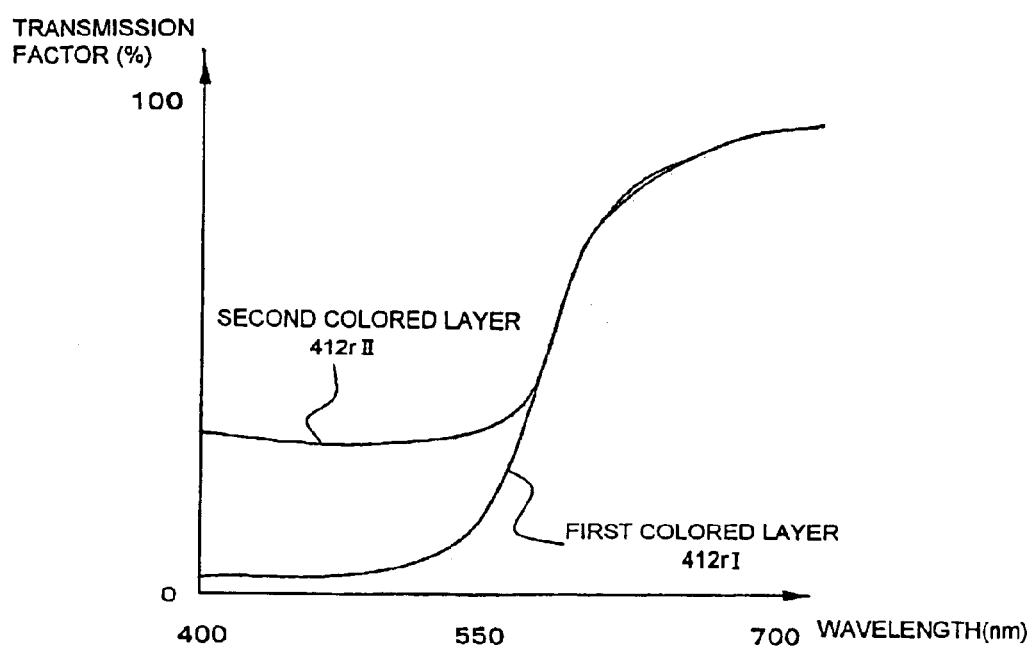
FIG. 4 is a graph showing the spectral transmission factors of a first colored layer and a second colored layer, concerning red (R)

Herein, the first colored layer 412I and the second colored layer 412II are made of materials which have different color purities in spite of an identical hue, as shown in FIG. 4 by way of example. FIG. 4 is a graph showing the spectral transmission factors of a first colored layer of red (R) 412rI and a second colored layer of red (R) 412rII. In this manner, in this exemplary embodiment, the spectral characteristic of the first colored layer of red (R) 412rI is superior to that of the second colored layer of red (R) 412rII. That is, regarding a case where light is transmitted through the first colored layer of red (R) 412rI, a sufficient red can be demonstrated by only one time of transmission, whereas regarding a case where light is transmitted through the second colored layer of red (R) 412rII, one time of transmission is insufficient. Such light to be transmitted through the second colored layer of red (R) 412rII may be transmitted through this second colored layer of red (R) 412rII a plurality of times in order to demonstrate a sufficient red. In this way, a red component contained in exit light can be more emphasized for the reason that the coloring of light to finally exit is expressed by the product of spectral transmission factors at individual wavelengths.

In this exemplary embodiment, the construction conforms to the above conditions because the first colored layer 412I is included in the transmission region GT, while only the second colored layer 412II is formed in the reflection region GR. That is, the light is transmitted through the first colored layer I only once in the transmission path T in the transmission type display, whereas the light is transmitted through the second colored layer II twice in the reflection path R in the reflection type display. Thus, image displays of substantially the same impressions become possible in both the reflection type display and the transmission type display.

The relationship as stated above is similarly existent for the colored layer of green (G) 412g and the colored layer of blue (B) 412b other than the colored layer of red (R). That is, signs "412I" and "412II" used in this exemplary embodiment imply the above layers "412rI" and "412rII", and also imply layers "412gI" and "412gII" and layers "412bI" and "412bII" though not especially referred to or illustrated, respectively.

In this exemplary embodiment, the first colored layer 412I mentioned above is formed so as to have a checkered pattern or a matrix-like pattern as shown in FIGS. 3(a) and 3(b). Besides, in this exemplary embodiment, predetermined distances D1 and D2 are respectively set between the outer edge of the first-colored-layer formation region IR and the inner edge of the transmission region GT, and between this outer edge and the boundary line of the transmission region GT and the reflection region GR. Due to the existence of the distances D1 and D2, as will be referred to in the later description of a manufacturing method, any misalignment at exposure steps can be absorbed by the distances D1 and D2 in case of forming the colored layers with photolithography. It is therefore possible to avoid, for example, a situation where the first colored layer 412I is formed extending into the reflection region GR.

On the other hand, the second colored layer 412II mentioned above is formed in the whole regions of both the reflection region GR and the transmission region GT except the first-colored-layer formation region IR. That is, in this case, the second colored layer 412II exists on the whole area of the reflection region GR, while the first colored layer 412I formed at the parts of the transmission region GT and the second colored layer 412II formed in the remaining region coexist in the transmission region GT. In this exemplary embodiment, a proper color purity difference as described with reference to FIG. 4 is set between the first colored layer 412I and the second colored layer 412II, and hence, a proper color purity difference is also set between the reflection region GR and the transmission region GT. The reason thereof is that the color mixture between the first colored layer 412I and the second colored layer 412II is realized in the transmission region GT. The color mixture between the first colored layer 412I and the second colored layer 412II in the transmission region GT can be very suitably realized owing to the fact that, in this exemplary embodiment, the first colored layer 412I is formed so as to have the matrix-like pattern.

Further, the first colored layer 412I and second colored layer 412II stated above are formed having the same thickness TS as shown in FIG. 3(b). Thus, defects on an image display as can occur in a case, for example, where a level difference ascribable to different thicknesses is involved between both the layers 412I and 412II are made less liable to appear. Strictly speaking, however, as shown in FIG. 1, the total thickness of the first colored layer 412I and second colored layer 412II which are formed on each aperture 411a becomes greater in correspondence with the thickness of the reflection layer 411 as compared with the thickness of the second colored layer 412II which is formed on the reflection layer 411.

However, it is not affected by such an extent of difference that the functional effect as stated above is achieved. In this manner, the "same" thickness termed in the present invention shall cover the case where the thicknesses differ to the extent shown in FIG. 1.

With the liquid-crystal display panel 400 of this exemplary embodiment thus constructed, first of all, it is possible to display color images which have no difference in visibility between the reflection type display utilizing the reflection region GR and the transmission type display utilizing the transmission region GT. This is based the fact that, in the reflection type display, the light forming the image exits by tracing the reflection path R along which it is transmitted through the second colored layer 412II of inferior spectral characteristic twice in total, while in the transmission type display, the light forming the image exists by tracing the transmission path T along which it is transmitted through the first colored layer 412I of superior spectral characteristic and the second colored layer 412II once, whereby the color mixture state of both the layers 412I and 412II is demonstrated.

Figure 5:
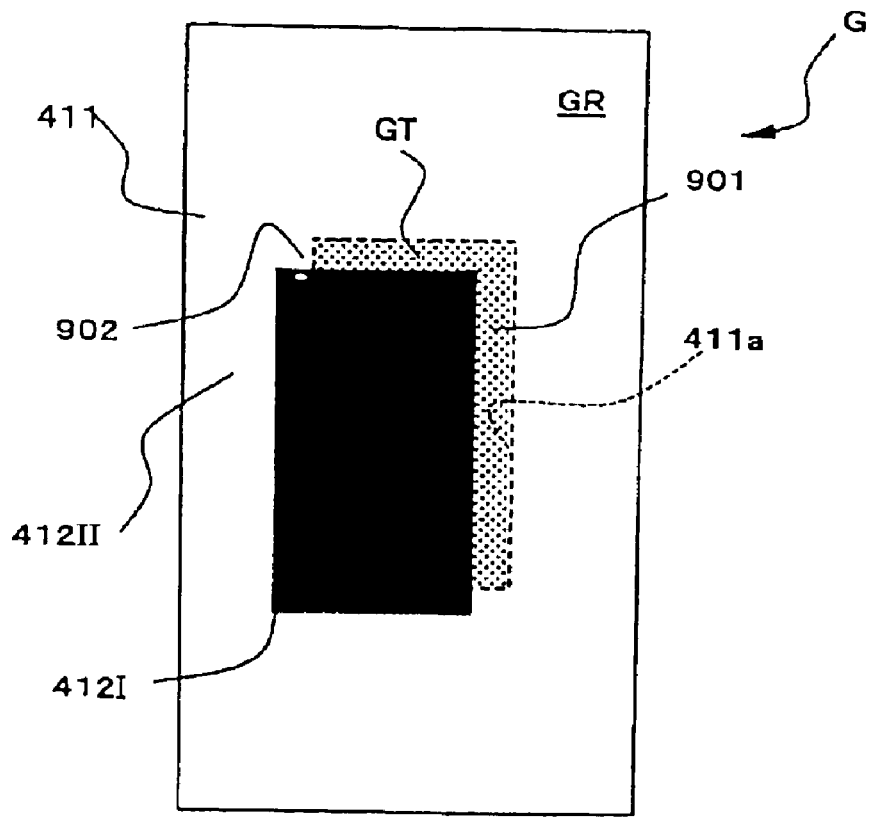
FIGS. 5(a) and 5(b) are plan views showing the formation aspect of colored layers on a transmission region and a reflection region in the related art.
Figure 5:
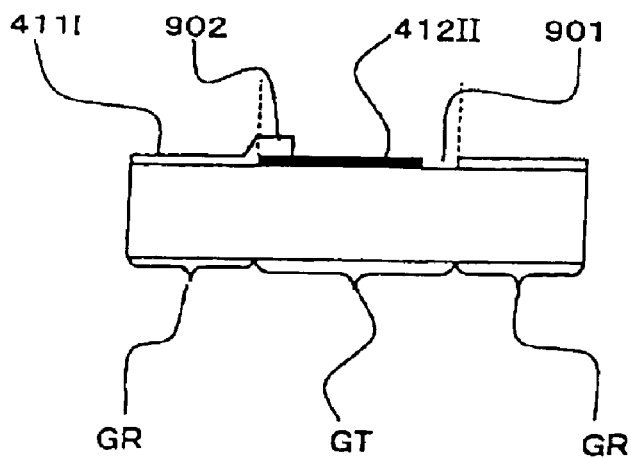

Especially in this exemplary embodiment, it is a significant feature that any gap or any overlap is not formed between the reflection region GR and the transmission region GT. This point differs from a case in the prior art where, as shown in FIGS. 5(a) and 5(b), a first colored layer 412I and a second colored layer 412II are simply formed for a transmission region GT and a reflection region GR, respectively. In such a case, it is highly possible that a gap 901 or an overlap 902 will be incurred between the first colored layer 412I and the second colored layer 412II by the appearance of a misalignment at a photolithographic step. When such a gap 901 or an overlap 902 has developed, light leakage, light shield or the like occurs to degrade an image quality. In contrast, in this exemplary embodiment, the second colored layer 412II is formed extending into the transmission region GT beyond the reflection region GR, so that such a gap 901 or an overlap 902 does not develop.

As described above, with the liquid-crystal display panel 400 according to this exemplary embodiment, it is permitted to present the color image displays of high quality.

Figure 6:
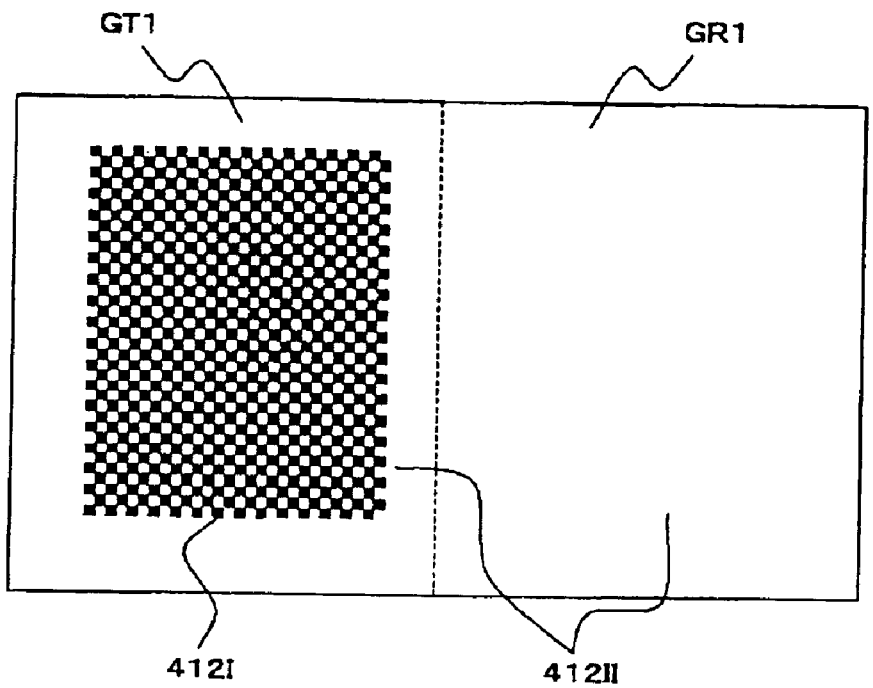
FIGS. 6(a) and 6(b) are similar plan views as FIGS. 3(a) and 3(b), showing a pixel in an aspect different from that in FIGS. 3(a) and 3(b)
Figure 6:
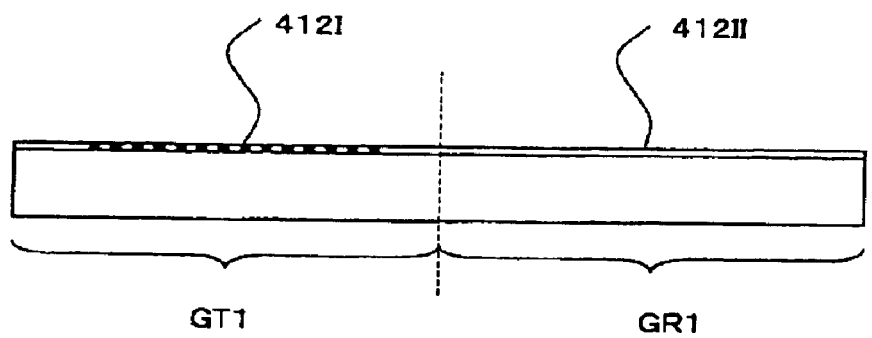

In the above exemplary embodiment, an aspect has been described where the aperture 411a, namely, the transmission region GT exists substantially centrally of each pixel G, and where the first colored layer 412I is formed in the matrix-like pattern, but the present invention is not restricted to such an aspect. First, even when another aspect of the aperture or the transmission region is selected to be one in which a transmission region GT1 and a reflection region GR1 exist in a manner to be simply separated at right and left as shown in FIGS. 6(a) and 6(b) by way of example, the present invention is applicable without making any essential alteration.

Figure 7:
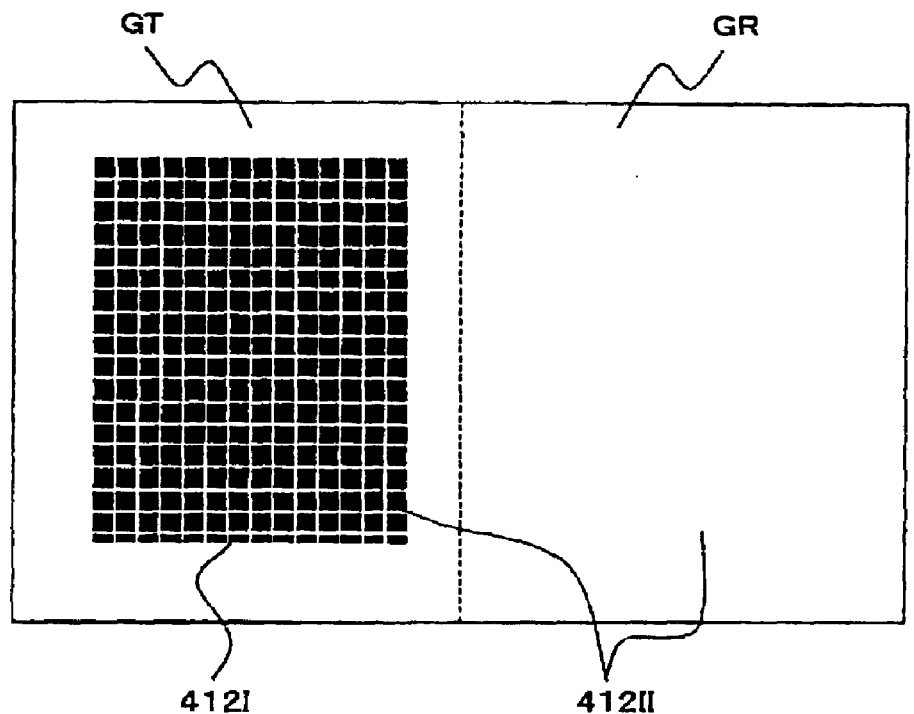
FIG. 7 is a similar plan view as FIGS. 3(a) and 3(b), showing the formation aspect of a first colored layer and a second colored layer on a transmission region and a reflection region within a pixel, the aspect being different from that in FIGS. 3(a) and 3(b)
Figure 8:
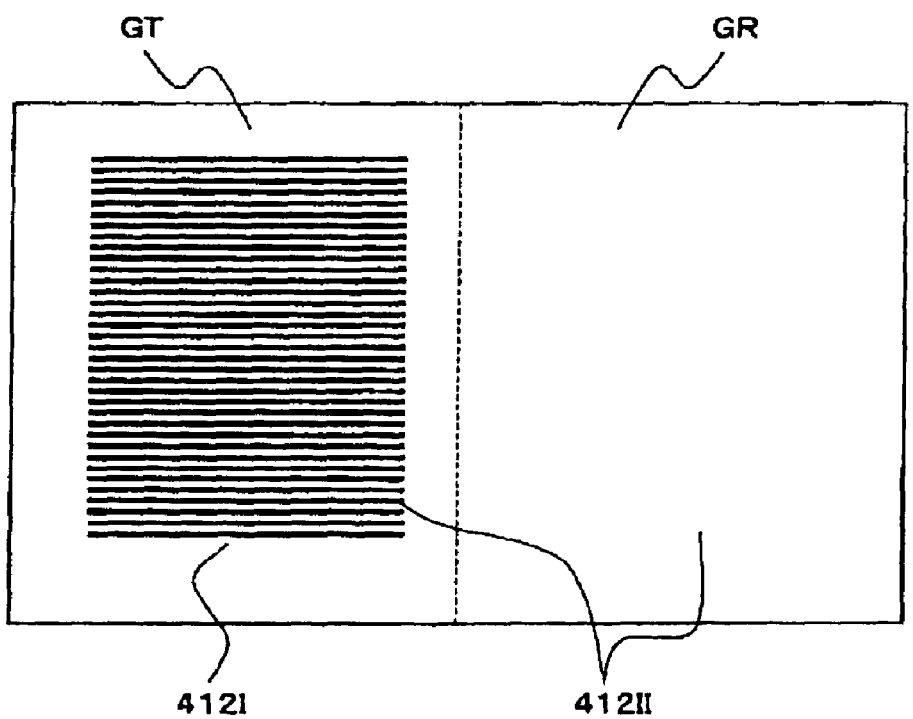
FIG. 8 is a similar plan view as FIGS. 3(a) and 3(b), showing the formation aspect of a first colored layer and a second colored layer on a transmission region and a reflection region within a pixel, the aspect being different from those in FIGS. 3(a) and 3(b) and 7.

Regarding the formation aspect of the first colored layer 412I, it is possible to select a matrix-like pattern in which a plurality of identical shapes are arrayed vertically and laterally, not the matrix-like pattern which includes the checkered pattern as shown in FIGS. 3(a) and 3(b), or a stripe-shaped pattern, as shown in FIG. 7 or FIG. 8 by way of example. By the way, as the first colored layer 412I takes such various concrete aspects, the degree of the color mixture between this first colored layer 412I and the second colored layer 412II in the transmission region GT becomes different. Conversely speaking, in this exemplary embodiment, a tint to be displayed in the transmission region RT can be adjusted by selecting a suitable formation aspect for the first colored layer 412I, and then adjusting the ratio between the whole area of the first-colored-layer formation region IR and the whole area of the other region (that is, the whole area of the transmission region GT where the second colored layer 412II is formed within the transmission region GT.

In the above, there has been described the aspect in which the first colored layer 412I and the second colored layer 412II coexist in the transmission region GT, but a reverse aspect shall be covered in the present invention. That is, it is also allowed to perform an aspect in which the first colored layer 412I and the second colored layer 412II coexist in the reflection region GR, and in which only the first colored layer 412I exists in the transmission region GT. In some cases, it is also allowed to perform an aspect in which the ratio of the whole areas as stated above is changed between the coexisting aspect of the first colored layer 412I and the second colored layer 412II in the reflection region GR and that in the transmission region GT.

(Electro-optic Device of Active Matrix Drive)

In the above exemplary embodiment, the liquid-crystal display panel 400 capable of passive matrix drive has been described as an example, but the present invention is not restricted to such an aspect. The present invention is applicable without any problem to, for example, a liquid-crystal display panel capable of active matrix drive, which includes pixel switching elements such as TFDs or TFTs. Moreover, in some cases, the application of the present invention is possible for an EL device, etc.

Figure 9:
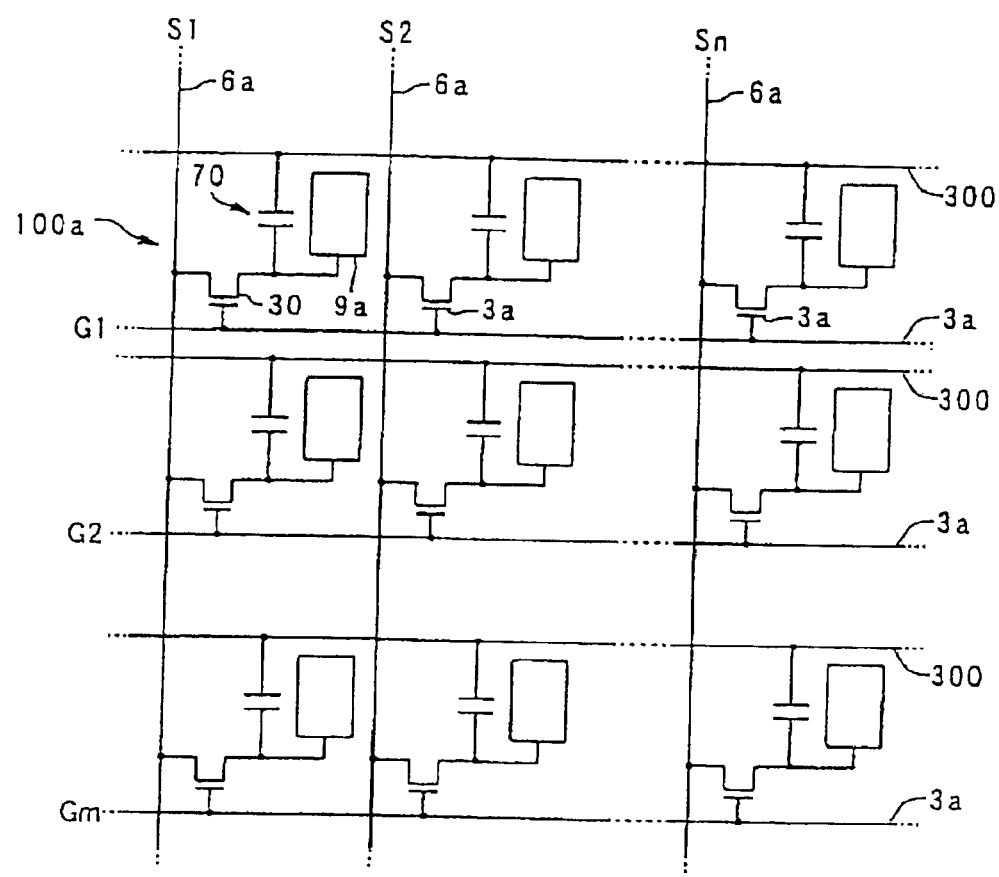
FIG. 9 is a schematic circuit diagram showing the equivalent circuit of various elements, wiring lines, etc. which are disposed in a plurality of matrix-like pixels constituting an image display region in the electro-optic device shown in FIG. 1.
Figure 10:
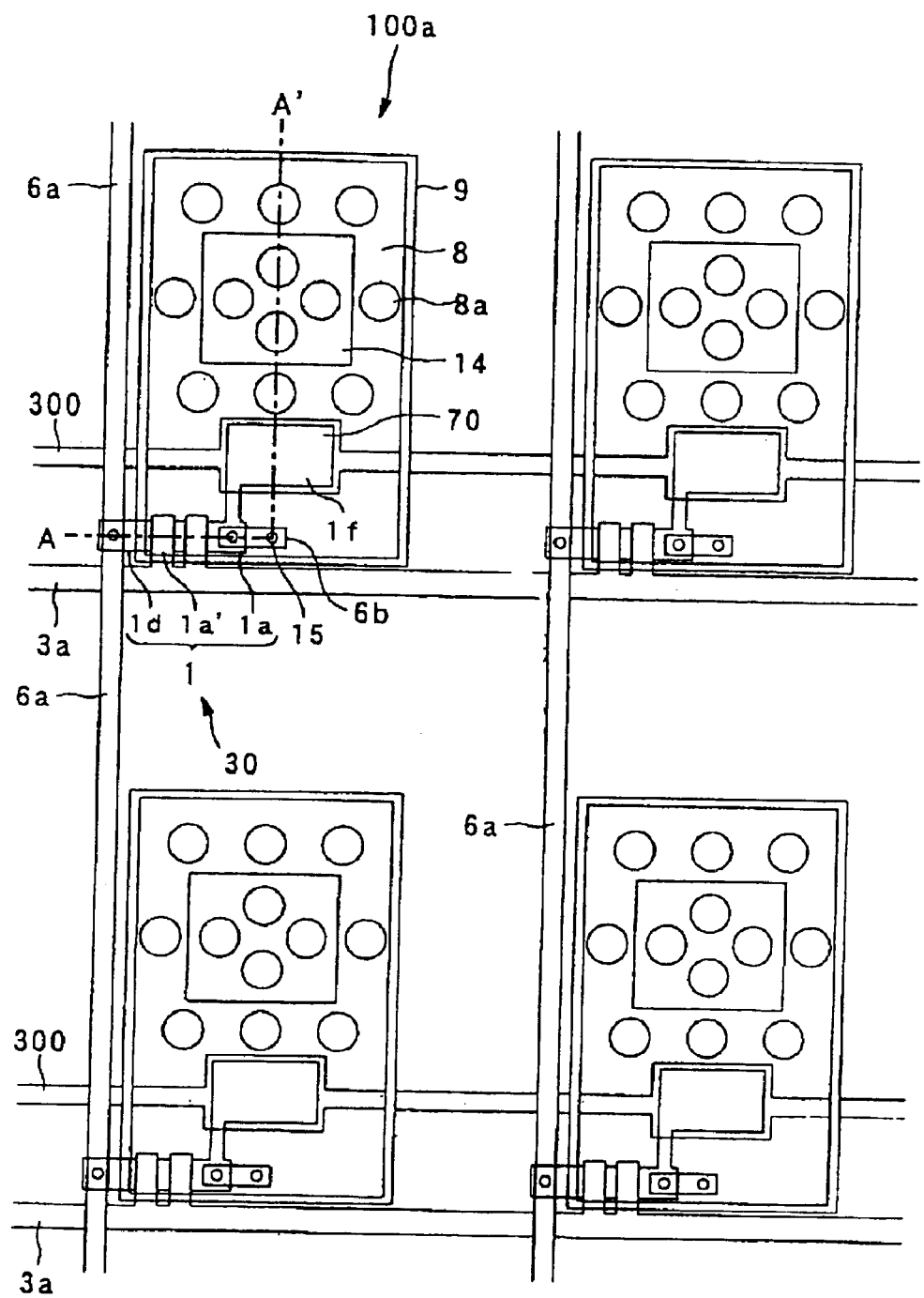
FIG. 10 is a plan view of a plurality of pixels adjacent to one another on a TFT array substrate.
Figure 11:
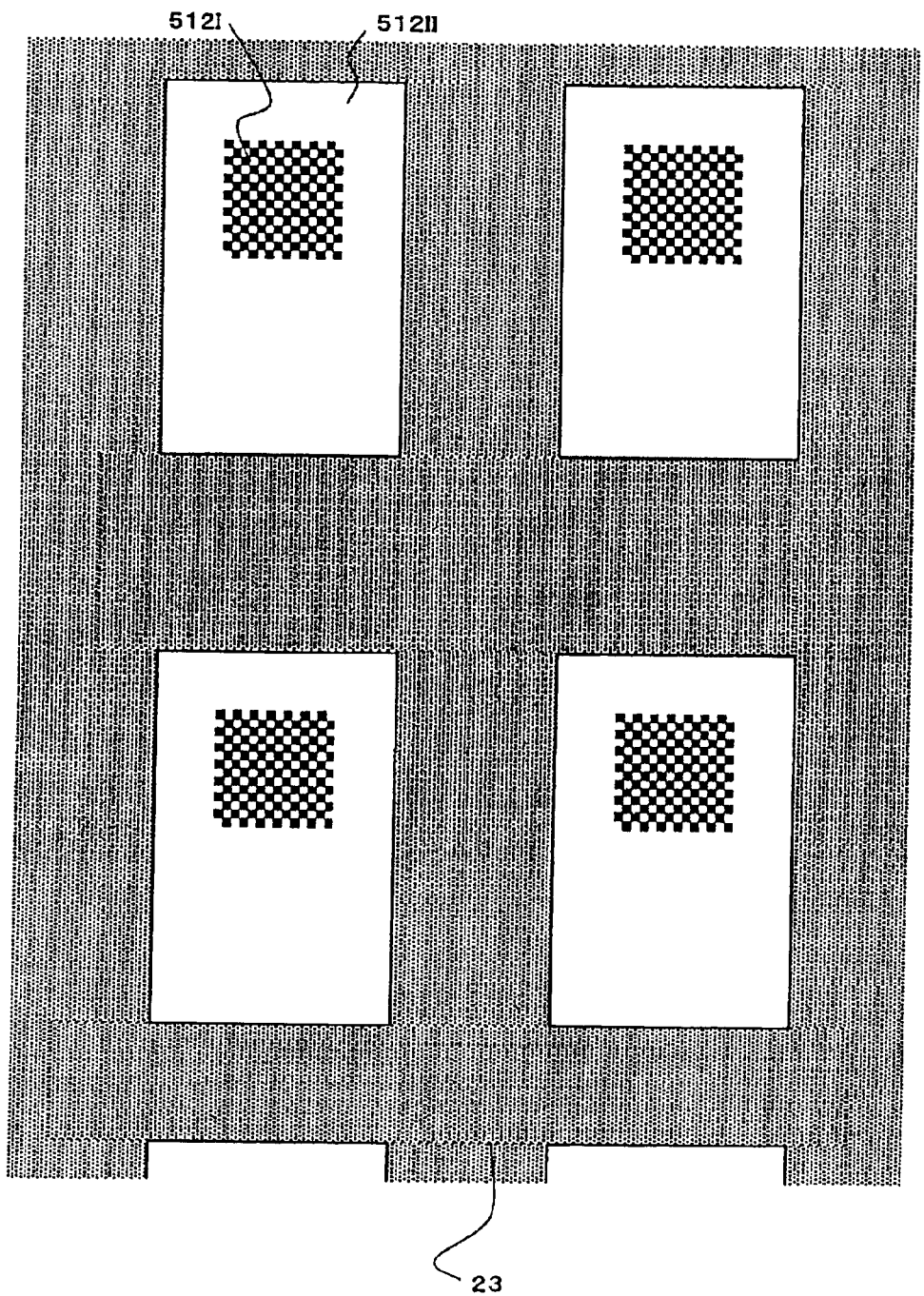
FIG. 11 is a plan view showing a construction on an opposing substrate which opposes the substrate in FIG. 10.
Figure 12:
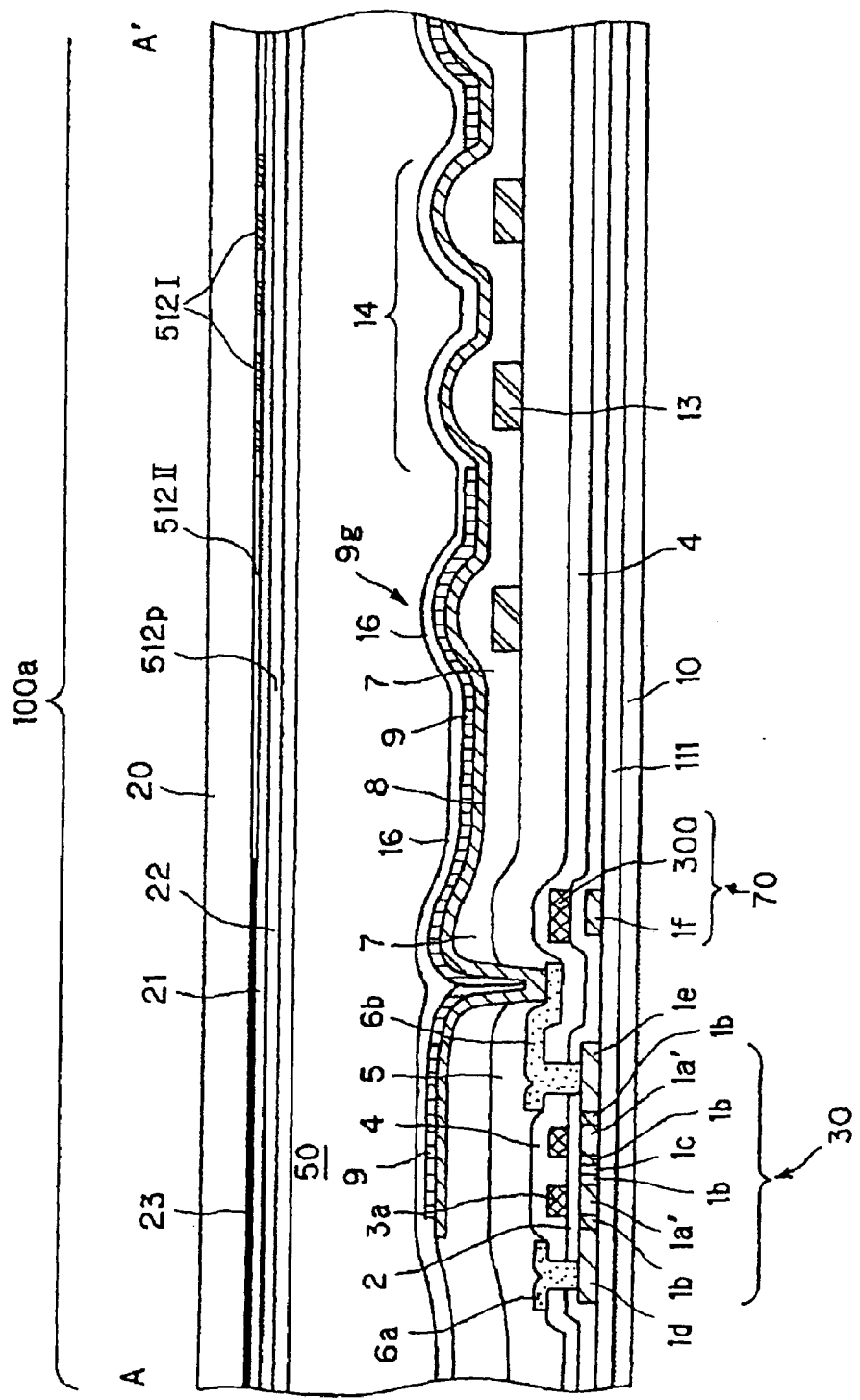
FIG. 12 is a sectional view taken along plane A–A' in FIG. 10.

In the ensuing, an aspect in which the color filter substrate of the present invention is applied especially to the liquid-crystal display panel of active matrix drive being one example of such devices will be described by referring to FIGS. 9 through 11 in succession. FIG. 9 shows the equivalent circuit of various elements, wiring lines, etc. in a plurality of pixels which constitute the image display region of an electro-optic device, and which are formed in the shape of a matrix. FIG. 10 is a plan view of the group of a plurality of pixels adjacent to one another on a TFT array substrate employed in this exemplary embodiment, and FIG. 11 is a plan view showing a construction on an opposing substrate which opposes to the substrate in FIG. 10. Further, FIG. 12 is a sectional view taken along plane A–A' in FIG. 10.

First, the active matrix drive will be described with reference to FIG. 9. In FIG. 9, each of a plurality of pixels 100a is formed with a pixel electrode 9a, and a TFT 30 for the switching control of the pixel electrode 9a, and each data line 6a which is supplied with an image signal is electrically connected to the sources of the corresponding TFTs 30. The image signals S1, S2, . . . , Sn to be written into the data lines 6a may be supplied in line sequence in this order, or may well be supplied to a plurality of adjacent data lines 6a every group.

Each scanning line 3a is electrically connected to the gates of the TFTs 30, and scanning signals G1, G2, . . . , Gm are applied to the scanning lines 3a pulse-wise at predetermined timings in line sequence in this order. Each pixel electrode 9a is electrically connected to the drain of the corresponding TFT 30, and the TFT 30 being a switching element is switched ON for a fixed time period, whereby the corresponding one of the image signals S1, S2, . . . , Sn supplied from the data lines 6a is written in at a predetermined timing.

The image signals S1, S2, . . . , Sn of predetermined levels written through the pixel electrodes 9a into a liquid crystal being one example of an electro-optic substance are retained between these pixel electrodes and an opposing electrode formed on the opposing substrate, for a fixed time period. The liquid crystal has the orientation or order of its molecular aggregate changed by applied voltage levels, thereby to modulate light and to realize a gradational display. In a normally-white mode, a transmission factor to enter light is decreased in accordance with a voltage applied in each individual pixel (100a) unit, and in a normally-black mode, a transmission factor to enter light is increased in accordance with a voltage applied in each individual pixel (100a) unit. Light which has a contrast corresponding to the image signals exits from the electro-optic device as a whole In order to reduce or prevent the retained image signals from leaking out, storage capacitors 70 are sometimes added in parallel with liquid crystal capacitances which are formed between the pixel electrodes 9a and the opposing electrode.

By way of example, the voltage of each pixel electrode 9a is retained by the storage capacitor 70 for a time period which is three orders longer than the application time period of a source voltage. Thus, the retention characteristic of charges is improved, and an electro-optic device of high contrast ratio can be incarnated. A method of forming the storage capacitors 70 may be either of a case of forming capacitor lines 300 which are special wiring lines dedicated to the storage capacitors, and a case of forming the storage capacitors between the pixel electrodes and the scanning lines 3a at respectively preceding stages.

A more practicable construction of the pixels 100a as stated above is described below with reference to FIGS. 10 through 12. Only four of the pixels are detailed in each of FIGS. 10 and 11, and only one of the pixels is detailed in FIG. 12.

Referring to FIG. 10, the TFT array substrate is overlaid, not only with the scanning lines 3a, the data lines 6a, etc. stated above, but also with the TFT 30, the storage capacitor 70, a transparent electrode 8, a reflection electrode 9, etc. which are disposed in correspondence with each individual pixel 100a. The above term "pixel electrode 9a" implies both the transparent electrode 8 and the reflection electrode 9 stated here.

First, the reflection electrodes 9 among the constituents are formed in the shape of a matrix on the TFT array substrate 10. Each of the reflection electrodes 9 is formed with a transmission window 14 as shown in FIG. 10, and a region corresponding to the transmission window 14 is covered with the transparent electrode 8. Such a reflection electrode 9 is made of a layer of aluminum or silver or any alloy thereof, or a film consisting of stacked layers of the above layer and a layer of titanium, titanium nitride, molybdenum, tantalum or the like, while such a transparent electrode 8 is made of ITO (indium tin oxide) or the like.

The data lines 6a, scanning lines 3a and capacitor lines 300 are formed along the vertical and lateral boundaries of the formation regions of the reflection electrodes 9 and transparent electrodes 8 arrayed in the shape of the matrix in this manner, and the pixel switching TFT 30 is electrically connected to each individual reflection electrode 9 through the corresponding transparent electrode 8. The data line 6a is made of, for example, aluminum, and the scanning line 3a and the capacitor line 300 are made of, for example, conductive poly-silicon. As shown in FIGS. 10 and 12, the TFT 30 includes a semiconductor layer 1a, into which suitable impurities are introduced, thereby to form a heavily-doped source region 1d, a heavily-doped drain region 1e and channel regions 1a'.

The data line 6a is electrically connected through a contact hole to the heavily-doped source region Id of the TFT 30 among the above regions, and the transparent electrode 8 is electrically connected through a source line 6b and a contact hole 15 to the heavily-doped drain region 1e.

The scanning line 3a is formed so as to extend over the channel regions 1a' of the TFT 30 through a gate insulating film 2 and to oppose thereto.

The TFT 30 in this exemplary embodiment has a so-called "double gate structure" as shown in FIGS. 10 and 12, so that the semiconductor layer 1a is formed with various regions in the order of the heavily-doped source region 1d, a lightly-doped region 1b, the channel region 1a', a lightly-doped region 1b, the channel region 1a', a lightly-doped region 1b and the heavily-doped drain region 1e from the left side in each figure.

Besides, the electro-optic device according to this exemplary embodiment is formed with each storage capacitor 70. The storage capacitor 70 has a structure in which the extension part 1f of a semiconductor film 1 for forming the pixel switching TFT 30, this extension part being made conductive, is included as a lower electrode, the capacitor line 300 being the same layer as that of the scanning line 3*a* is included as an upper electrode, and a dielectric film made of TaOx, SiOx or the like is interposed between the upper and lower electrodes. Owing to the provision of such a storage capacitor 70, the retention characteristic of charges in the liquid crystal capacitance can be remarkably enhanced.

On the other hand, a block lump layer 13 and an uneven layer 7 overlying it (neither of which is shown in FIG. 10) are formed under the reflection electrode 9 and the transparent electrode 8 as shown in FIG. 12. The block lump layer 13 and the uneven layer 7 are made of a photosensitive resin, for example, an organic resin, and the former is a layer which is formed so as to include block lumps sporadically existing on a substrate surface, while the latter is a layer which is formed so as to cover the whole surface of the substrate including such a block lump layer 13. Accordingly, the surface of the uneven layer 7 has an uneven shape which conforms to the sporadic aspect of the block lumps constituting the block lump layer 13. Incidentally, owing to the formation of such an uneven layer 7, the uneven shape at the surface of the uneven layer 7 is endowed with an appropriate smoothness as is obtained by smoothening, so to speak, an "abrupt uneven shape" in the block lump layer 13.

Due to the block lump layer 13 and the uneven layer 7, uneven patterns 9*g* are especially formed in the reflection electrode 9. In FIG. 10, the uneven patterns 9*g* are shown in the shape of circles, and the circular parts protrude to front side on the sheet of the drawing as compared with the other parts.

In the electro-optic device having such a construction, it is permitted by utilizing the transparent electrodes 8 and the transmission windows 14 to present an image display based on a transmission mode, and it is permitted by utilizing the reflection electrodes 9 and the block lump layer 13, uneven layer 7 and uneven patterns 9*g* to present an image display based on a reflection mode. More specifically, a region defined by the former construction is a transmission region in which light emitted from an internal light source, not shown, is transmitted so as to proceed from the back side to the front side of the sheet of FIG. 10, while a region defined by the latter construction becomes a reflection region in which light proceeds from this side of the sheet to the reflection electrodes 9 and proceeds to the front side of the sheet again after reflection. By the way, in the latter case, the scattering reflection of the light is especially caused by the uneven patterns 9*g*, so that the view angle-dependence of an image can be mitigated.

In FIG. 12, in addition to the above constituents, a protective underfilm 111 which is made of a silicon oxide film (insulating film) being 100–500 nm thick is formed on the TFT array substrate 10, a first inter-layer insulating film 4 which is made of a silicon oxide film being 300–800 nm thick is formed on the protective underfilm 111 and the TFT 30, and a second inter-layer insulating film 5 (surface passivation film) which is made of a silicon nitride film being 100–800 nm thick is further formed on the first inter-layer insulating film 4. In some cases, however, the second inter-layer insulating film 5 need not be formed.

Especially in the liquid-crystal display panel of active matrix drive scheme, the opposing substrate 20 which is arranged in opposition to the TFT array substrate 10 having the construction as stated above, while sandwiching the liquid crystal 50 between both the substrates, is formed with a light shield film 23 having a checkered pattern when viewed in plan, a color filter 512, an opposing electrode 21 and an orientation film 22 in succession from below (in succession from above in FIG. 12). Among them, the light shield film 23 is made of a black resin material, a metal, such as chromium, an alloy or the like, and as shown in FIG. 11, it is formed in the checkered pattern so as to correspond to the matrix-like pixel electrodes 9*a* shown in FIG. 10. The opposing electrode 21 is made of a transparent conductive material, for example, ITO, and it is formed over the whole surface of the opposing substrate 20. Although the opposing electrode 21 is formed over the whole surface as stated above, it is demonstrated as if it were arrayed in the shape of a matrix, because it is underlaid with the checkered light shield film 23.

The color filter 512 is made of colored layers 512*r*, 512*g* and 512*b* and an overcoat layer 512*p* in substantially the same manner as in the foregoing passive matrix drive. Among them, each of the colored layers 512*r*, 512*g* and 512*b* of respective colors consists of a first colored layer 512I and a second colored layer 512II whose color purities are different from each other, every pixel 100*a* as shown in FIG. 11. As shown in FIGS. 10 through 12, the first colored layer 512I of the former is formed so as to correspond to the formation region of the transmission window 14 formed in the reflection electrode 9, that is, the transmission region, while the second colored layer 512II of the latter is formed so as to correspond to the formation region of the reflection electrode 9, that is, the reflection region. In addition, the first colored layer 512I is formed partly in the transmission region, more concretely, so as to have a matrix-like pattern, and the second colored layer 512II is formed over the entire areas of the transmission region and the reflection region and in a region where the first colored layer 512I is not formed. The overcoat layer 512*p* has substantially the same construction and function as those of the foregoing protective film 412*p*.

Such a liquid-crystal display panel of active matrix drive has two greatly different points as compared with the foregoing liquid-crystal display panel of passive matrix drive. In the first place, the reflection layer 411 is not formed separately from the transparent electrodes 413 and 421 for applying electric fields to the liquid crystal 404, as in the foregoing liquid-crystal display panel of passive matrix drive, but the reflection electrodes 9 having both the function as the electrodes 413, 421 and the function of reflecting entering light are formed. Secondly, the color filter 512, or the colored layers 512*r*, 512*g* and 512*b* is/are formed on the substrate (namely, the opposing substrate 20) different from the substrate formed with the reflection electrodes 9.

It is obvious, however, that, in spite of such differences, the functional effects already stated can be quite similarly enjoyed even with the liquid-crystal display panel shown in FIGS. 9 through 12. That is, also in such a liquid-crystal display panel, none of the lack of the colored layers, the superfluous overlap thereof, etc. occurs between the transmission region and the reflection region, so that degradation in the quality of a color image attributed to light leakage, light shield, etc. is not incurred (refer to FIGS. 11 and 12).

(General Construction of Electro-optic Device)

Figure 13:
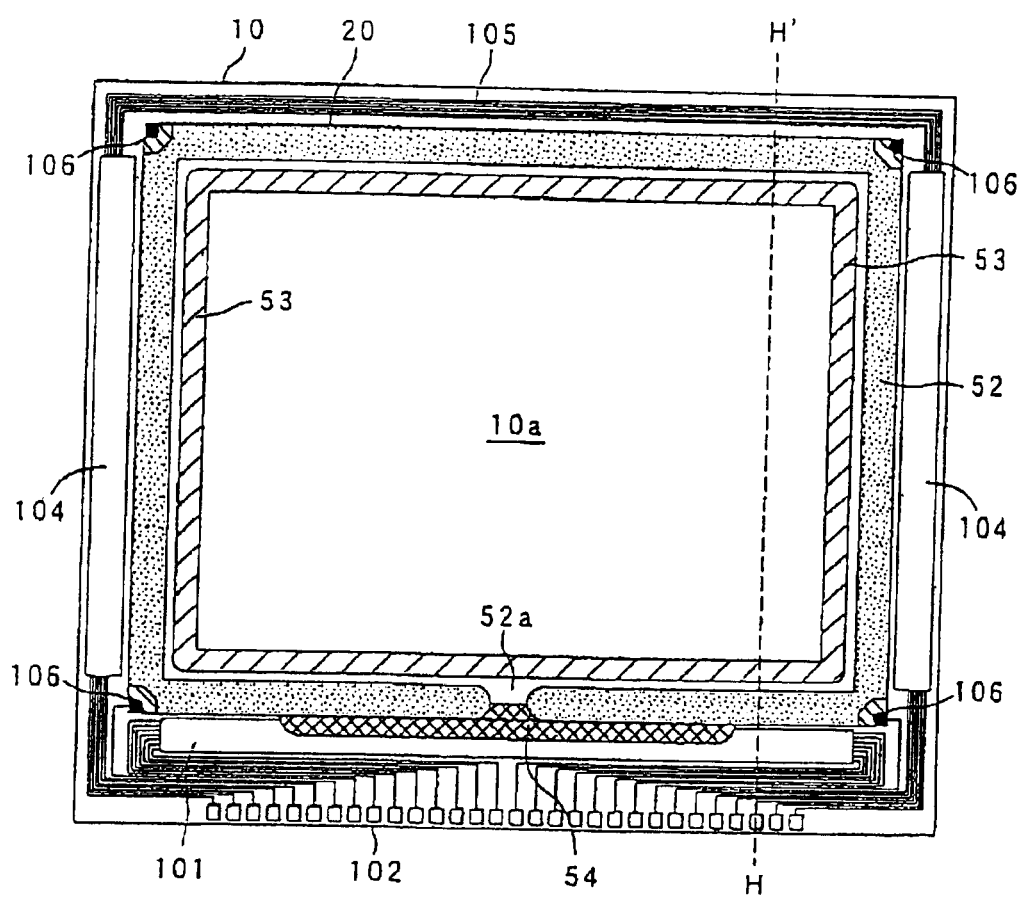
FIG. 13 is a plan view in which a TFT array substrate in an electro-optic device in an exemplary embodiment of the present invention is viewed from the side of an opposing substrate, together with various constituents formed on the former substrate.
Figure 14:
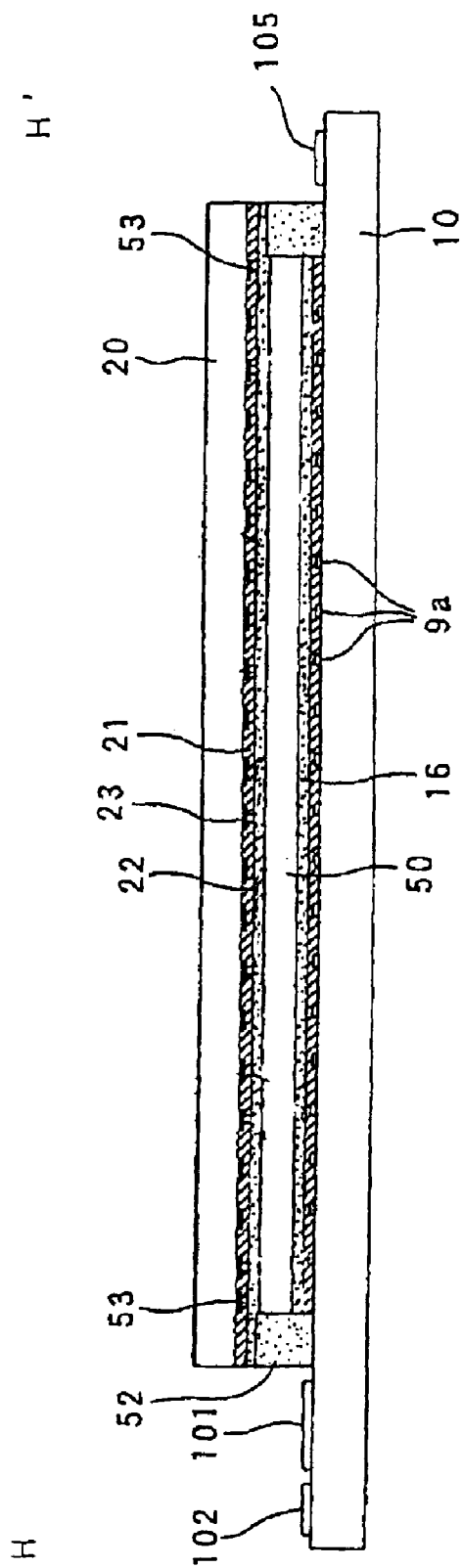
FIG. 14 is a sectional view taken along plane H–H' in FIG. 13.

The liquid-crystal display panel of active matrix drive as stated above has a general construction as shown in FIGS. 13 and 14. FIG. 13 is a plan view in which a TFT array substrate is seen from the side of an opposing substrate 20, together with various constituents formed on the former substrate, while FIG. 14 is a sectional view taken along plane H–H' in FIG. 13.

Referring to FIGS. 13 and 14, in the electro-optic device according to this exemplary embodiment, the TFT array substrate 10 and the opposing substrate 20 are arranged in opposition. A liquid crystal 50 is tightly enclosed between the TFT array substrate 10 and the opposing substrate 20, and the TFT array substrate 10 and the opposing substrate 20 are bonded to each other by a sealant 52 which is disposed in a sealing region located around an image display region 10a.

In order to stick both the substrates together, the sealant 52 is made of, for example, an ultraviolet-setting resin or a thermosetting resin, and it is set by ultraviolet radiation or heating. Besides, if the liquid crystal device in this exemplary embodiment is a small-sized one which presents an enlarged display as in a projector use, a gap material (spacer), such as glass fiber or glass beads to bring the distance between both the substrates (an inter-substrate gap) to a predetermined value is dispersed in the sealant 52. Alternatively, if the liquid crystal device is a large-sized one which presents a full-size display like a liquid crystal display or a liquid-crystal television receiver, such a gap material may be contained in the liquid crystal layer 50.

In a region outside the sealant 52, a data line driver circuit 101 and external-circuit connection terminals 102 which drive data lines 6a by supplying image signals to the data lines 6a at predetermined timings are disposed along one latus of the TFT array substrate 10, and scanning line driver circuits 104 which drive scanning lines 3a by supplying scanning signals to the scanning lines 3a at predetermined timings are disposed along two lateral adjacent to the latus. If the delay of the scanning signals to be supplied to the scanning lines 3a poses no problem, only one scanning line driver circuit 104 suffices. Also, data line driver circuits 101 may well be arrayed on both sides along the lateral edges of the image display region 10a.

A plurality of wiring lines 105 to join the scanning line driver circuits 104 disposed on both the sides of the image display region 10a are laid on one remaining latus of the TFT array substrate 10.

Besides, a conductive material 106 to establish electrical conduction between the TFT array substrate 10 and the opposing substrate 20 is disposed in, at least, one of the corners of the opposing substrate 20.

Referring to FIG. 14, the TFT array substrate 10 is overlaid with an orientation film 16 which is formed on pixel electrodes 9a after pixel switching TFTs and the wiring lines, such as scanning lines and data lines, have been formed. On the other hand, the opposing substrate 20 is overlaid with an opposing electrode 21, and also an orientation film 22 at the uppermost layer part. Besides, the liquid crystal layer 50 is made of a liquid crystal in which one or more sorts of nematic liquid crystals, for example, are mixed, and it takes predetermined orientation states between the pair of orientation films.

The TFT array substrate 10 may well be overlaid with, in addition to the data line driver circuit 101, the scanning line driver circuits 104, etc., a sampling circuit which applies image signals to the plurality of data lines 6a at predetermined timings, precharge circuits which supply precharge signals of predetermined voltage level to the plurality of data lines 6a in advance of the image signals, respectively, an inspection circuit which serves to inspect the quality, defects, etc. of the electro-optic device in the course of manufacture or at shipment, and so forth.

Such an external appearance of the general construction of the electro-optic device is not greatly different even in the electro-optic device of passive matrix drive.

(Manufacturing Method)

Next, a method of manufacturing the foregoing color filter substrate shown in FIGS. 1 and 2 is described below with reference to FIGS. 15(a)–15(c). Since this exemplary embodiment features that the pixels G including the aspect as shown in FIGS. 3(a) and 3(b), etc. are constructed, this point is described in detail below, and the other points shall be properly omitted or simplified.

Figure 15:
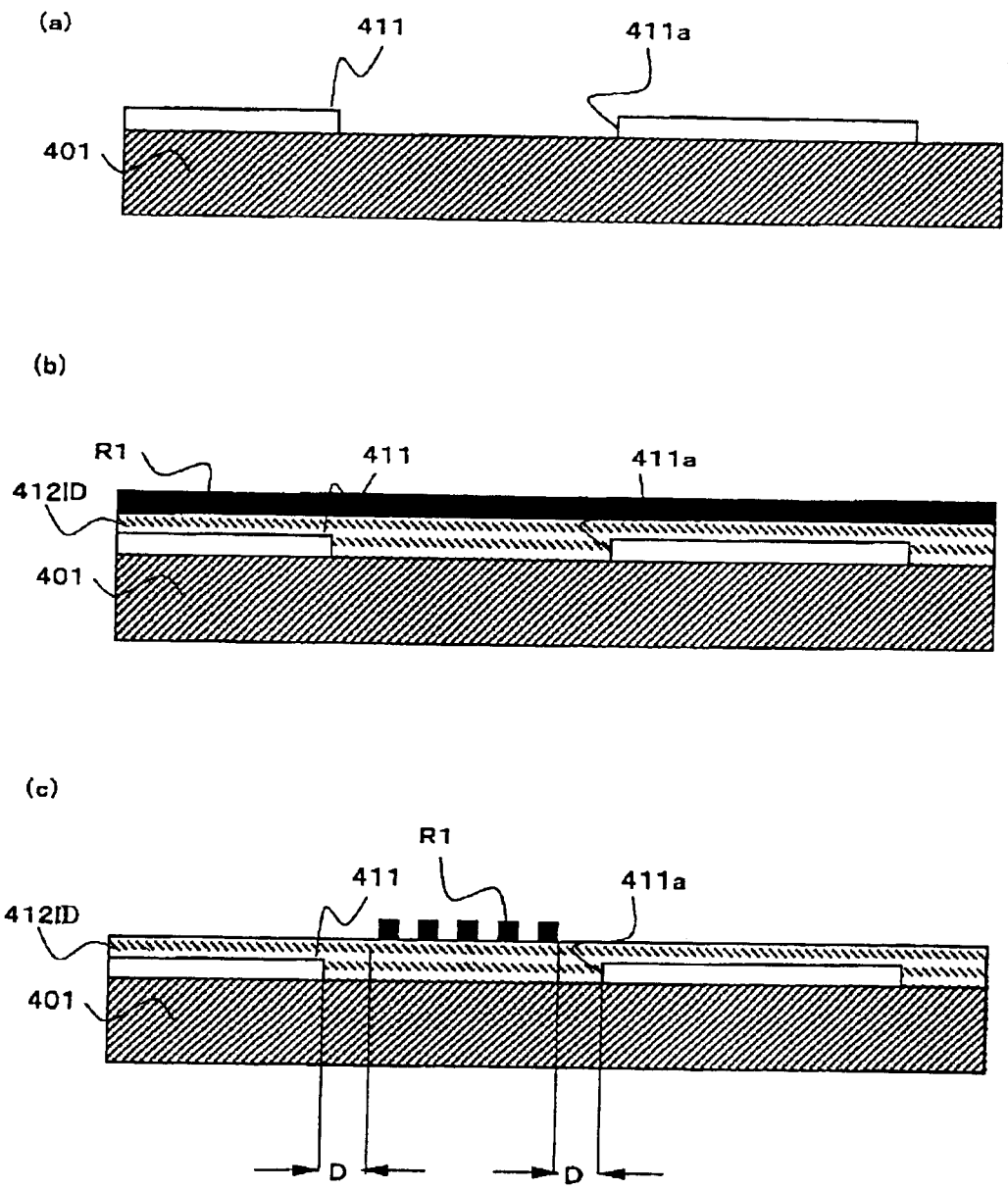
FIGS. 15(a)–15(c) are schematic sectional views showing a processing step (#1) of a method of manufacturing the color filter substrate according to an exemplary embodiment.

First, as shown in FIG. 15(a), on a first substrate 401, a metal, such as aluminum, an aluminum alloy, a silver alloy or chromium is formed into a reflective underlayer being about 50–250 nm thick, by evaporation, sputtering or the like. Thereafter, apertures 411a are formed by applying photolithography or the like, so as to have a predetermined pattern as shown in FIG. 2 by way of example. By the way, in this specification, a "reflection layer 411" is deemed to be formed, at a stage at which the apertures 411a as shown in FIG. 15(a) have been provided.

Subsequently, as shown in FIG. 15(b), the underfilm 412ID of a first colored layer 412I made of a photosensitive resin material in which a pigment or a dye demonstrating a predetermined hue is dispersed, or the like is formed on the reflection layer 411 including the apertures 411a, whereupon a resist film R1 is formed on the underfilm 412ID.

Subsequently, as shown in FIG. 15(c), the resist film R1 is subjected to an exposure step, thereby to be endowed with a predetermined pattern, and it is subjected to a development step. Among them, the exposure step is performed so as to include a matrix-like pattern in the shape of a checkered pattern on each aperture 411a and to remove all the resist film R1 from the other part, as shown in the figure. At the exposure step in this exemplary embodiment, a predetermined distance D is set between the outer edge of a first-colored-layer formation region IR and the inner edge of a transmission region GT as described with reference to FIGS. 3(a) and 3(b), etc. Thus, even if misalignment has appeared at the exposure step, the predetermined distance D can absorb the misalignment. Therefore, such a situation is avoided that the first colored layer 412I is formed extending into a reflection region GR.

Figure 16:
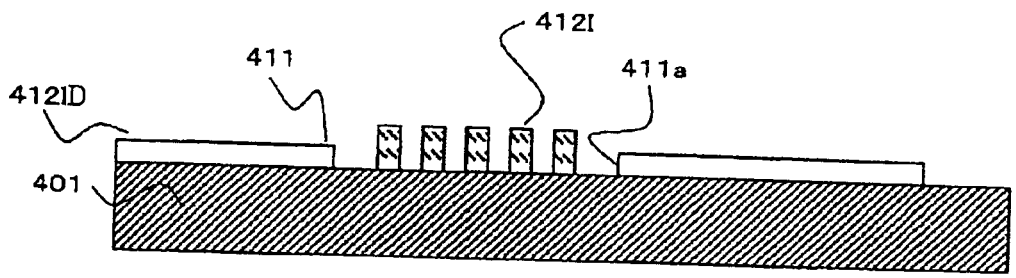
FIGS. 16(d)–16(f) are schematic sectional views showing a processing step (#2) of a method of manufacturing the color filter substrate according to this exemplary embodiment.
Figure 16:
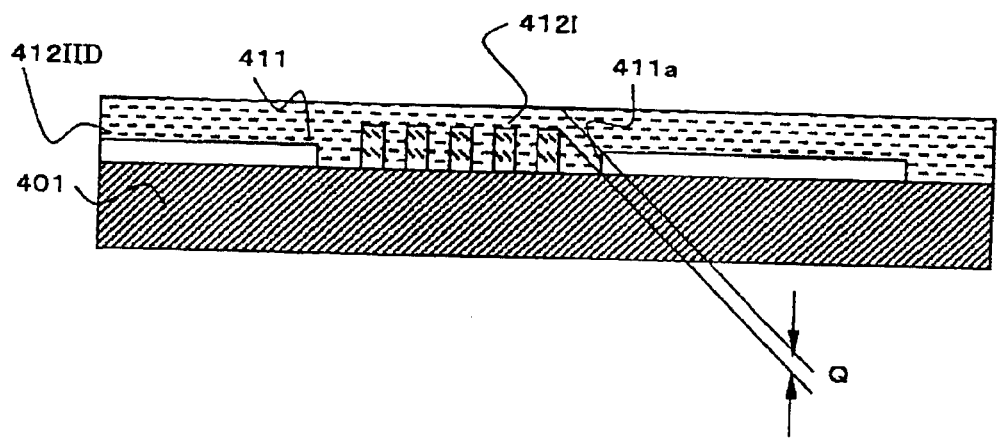
Figure 16:
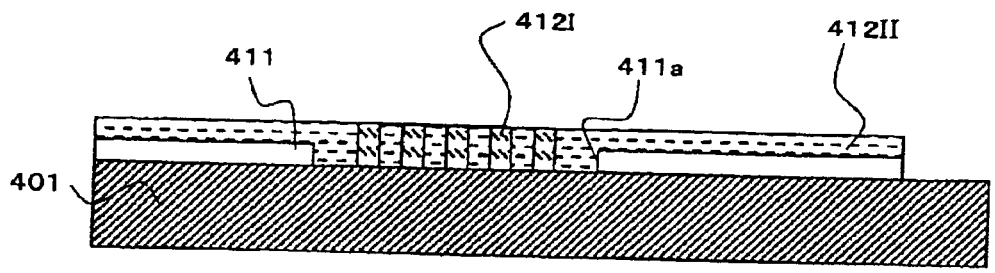
Figure 17:
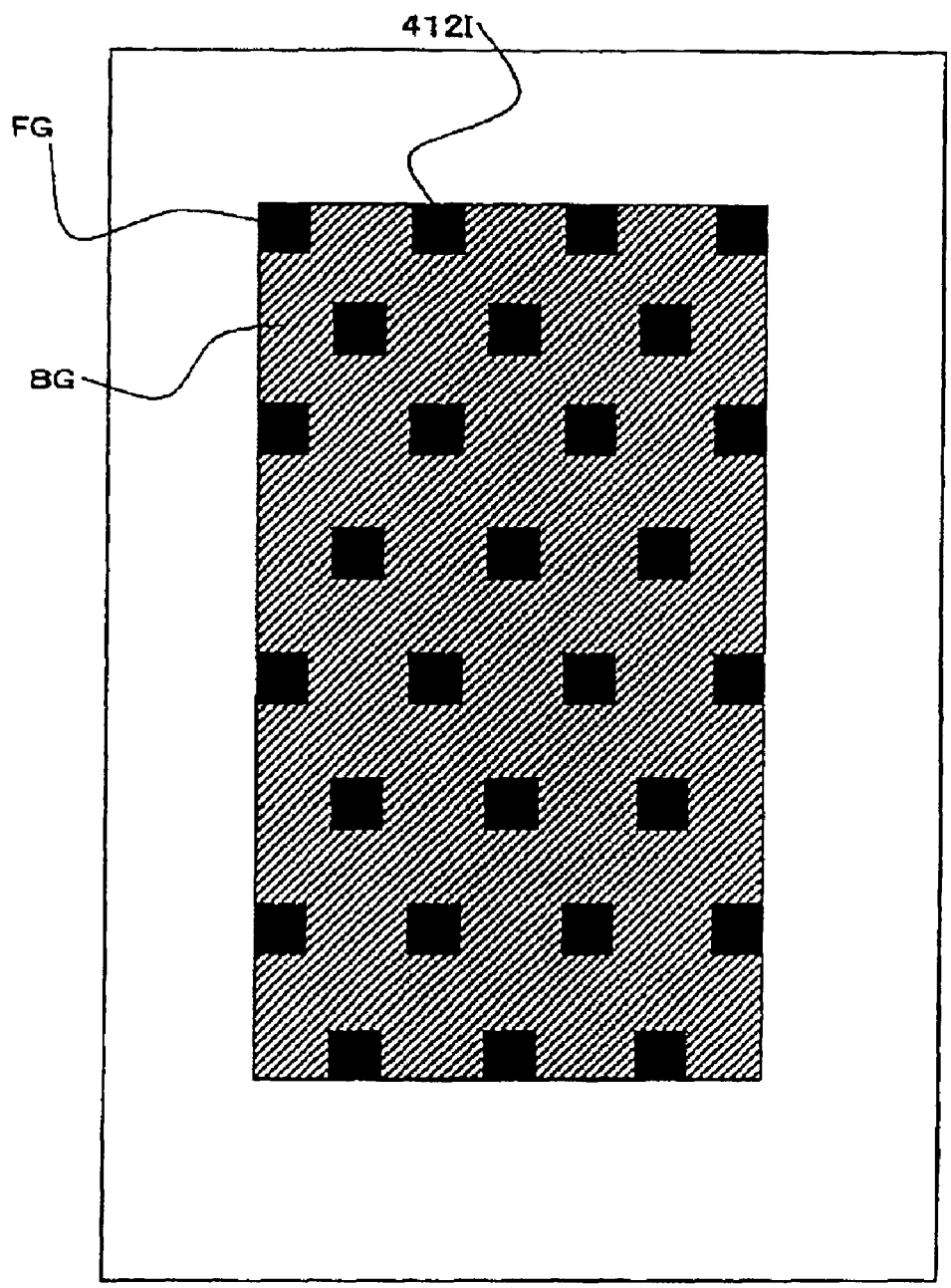
FIG. 17 is a plan view showing the form of a first colored layer in an aspect which is well suited to prevent a resist film from remaining.

Subsequently, as shown in FIG. 16(d), the resist film R1 patterned as stated above and the underfilm 412ID are both etched, and the resist film R1 is thereafter removed. Thus, as shown in the figure, the first colored layer 412I of the matrix-like pattern including the checkered pattern as shown in FIGS. 3(a) and 3(b), etc. is formed on each aperture 411a, that is, on the transmission region GT. On this occasion, attention as stated below may be paid concerning the concrete aspect of the first colored layer 412I. As shown in FIG. 17, in the first colored layer 412I, the total of the areas of individual shapes FG constituting the matrix-like pattern is made smaller than the area of a part BG in the matrix-like pattern, except the individual shapes FG (hereinbelow, termed "background part BG"). In FIG. 17, the shapes FG, in other words, the first colored layer 412I itself, are/is indicated in black, and the background part BG is indicated by the hatching of oblique lines descending leftwards.

According to this structure, the first colored layer 412I is formed in a state of, so to speak, many interstices as shown in FIG. 17, and it can therefore be the that the area of the shapes FG becomes comparatively small. Thus, all or part of the resist film R1 hardly remains on the shapes FG, namely, on the first colored layer 412I, and it is permitted to prevent the occurrence of such a situation that a color different from an original color display is displayed.

When the formation of the first colored layer 412I has been completed as stated above, the underfilm 412II) of a second colored layer 412II is subsequently formed on the whole surfaces of both the reflection region GR and the transmission region GT which includes the first colored layer 412I formed as stated above, as shown in FIG. 16(e). On this occasion, in this exemplary embodiment, the underfilm 412IID is formed so as to have a thickness which is greater by Q than the thickness of the second colored layer 412II to be finally formed (refer to FIG. 16(f)).

Lastly, as shown in FIG. 16(f), the underfilm 412IID is appropriately patterned by subjecting it to the formation of a resist film not shown, exposure and etching as in the foregoing case of the first colored layer 412I, and it is also baked. Here at the baking, the surplus thickness Q of the underfilm 412IID described with reference to FIG. 16(e) is extinguished (so to speak, the "film decreases"), and the second colored layer 412II having the same thickness as that of the first colored layer 412ID is formed.

In this manner, in this exemplary embodiment, the surplus thickness Q is anticipated from the beginning for the underfilm 412IID of the second colored layer 412II, whereby the thicknesses of the second colored layer 412II and the first colored layer 412I can be naturally equalized by the baking of the second colored layer 412II. Such an aspect can lower the possibility of giving rise to a defect on an image display as can occur in the existence of a level difference ascribable to the difference between the thicknesses of both the layers. Incidentally, although the thickness of the first colored layer 412I on the aperture 411a and that of the second colored layer 412II on the reflection layer 411 are different in FIG. 16(f), it is as stated above that such an extent of difference falls within the "same" thickness range termed in the present invention.

When the manufacturing process as stated above is undergone, some of the pixels G in the aspect as shown in FIGS. 3(a) and 3(b), etc. when viewed in plan can be constructed.

In the above, the first colored layer 412I and the second colored layer 412II are formed using photolithography, but the present invention is not restricted to such an aspect. It is sometimes possible to form the first colored layer 412I and the second colored layer 412II as shown in FIGS. 3(a) and 3(b), etc., by such a technique that suitable colored ink materials are applied/printed by employing an ink jet printer, not shown. On this occasion, the application/printing can form, for example, the arrays of the respective colors R, G and B in the striped arrays shown in FIG. 2, at one time in accordance with the positions of the individual apertures 411a.

(Electronic Equipment)

The electro-optic device constructed as stated above can be employed as the display unit of each of various electronic equipment, and one example thereof is concretely described below with reference to FIGS. 18-20.

Figure 18:
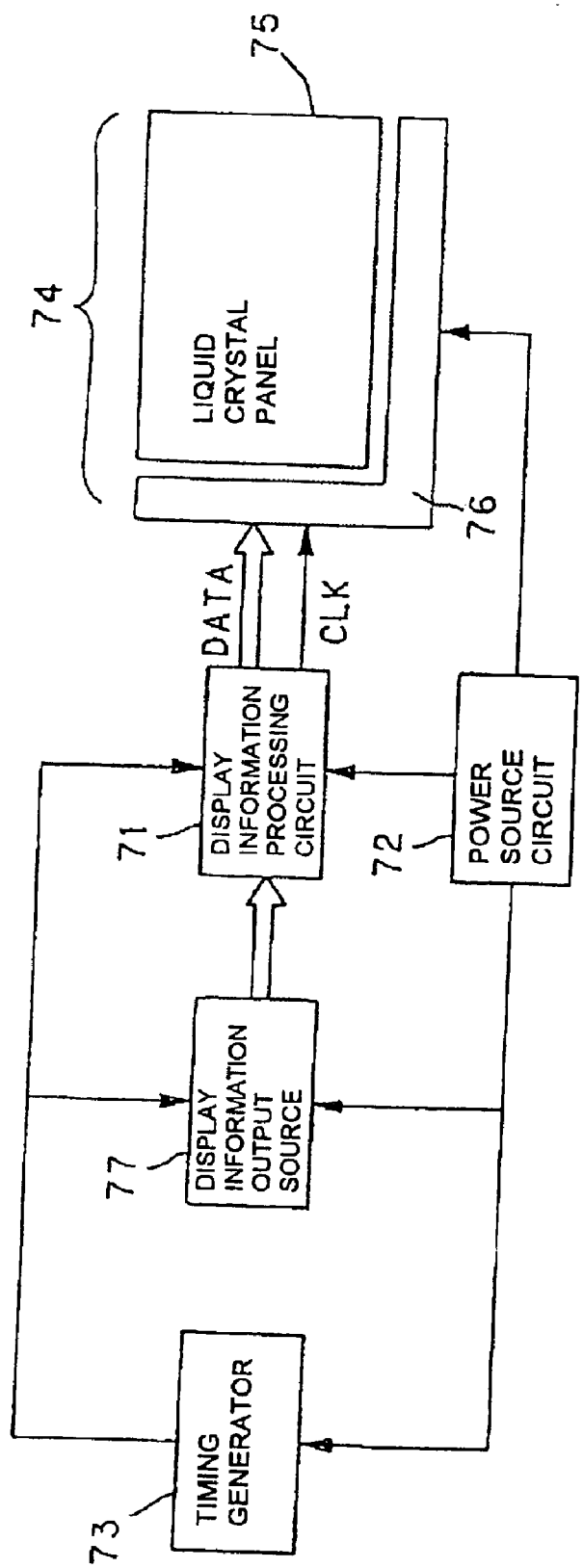
FIG. 18 is a schematic showing the circuit arrangement of an electronic equipment in which an electro-optic device according to the present invention is employed as a display device.

FIG. 18 is a schematic showing the circuit arrangement of the electronic equipment in which the electro-optic device according to the present invention is employed as a display device.

Referring to FIG. 18, the electronic equipment includes a display information output source 77, a display information processing circuit 71, a power source circuit 72, a timing generator 73 and a liquid-crystal display device 74. Besides, the liquid-crystal display device 74 includes a liquid-crystal display panel 75 and a driver circuit 76. The electro-optic device stated before can be employed as the liquid crystal device 74.

The display information output source 77 includes memories, such as a ROM (Read Only Memory) and a RAM (Random Access Memory), storage units, such as various disks, a tuning circuit to tune and outputting digital image signals, and so forth, and it supplies the display information processing circuit 71 with display information such as image signals of predetermined format, on the basis of various clock signals generated by the timing generator 73.

The display information processing circuit 71 includes various known or related art circuits, such as a serial-parallel conversion circuit, an amplifier/inverter circuit, a rotation circuit, a gamma correction circuit and a clamp circuit. It executes the processing of the inputted display information, and supplies the processed image signals to the driver circuit 76 together with a clock signal CLK. The power source circuit 72 supplies predetermined voltages to the individual constituents.

Figure 19:
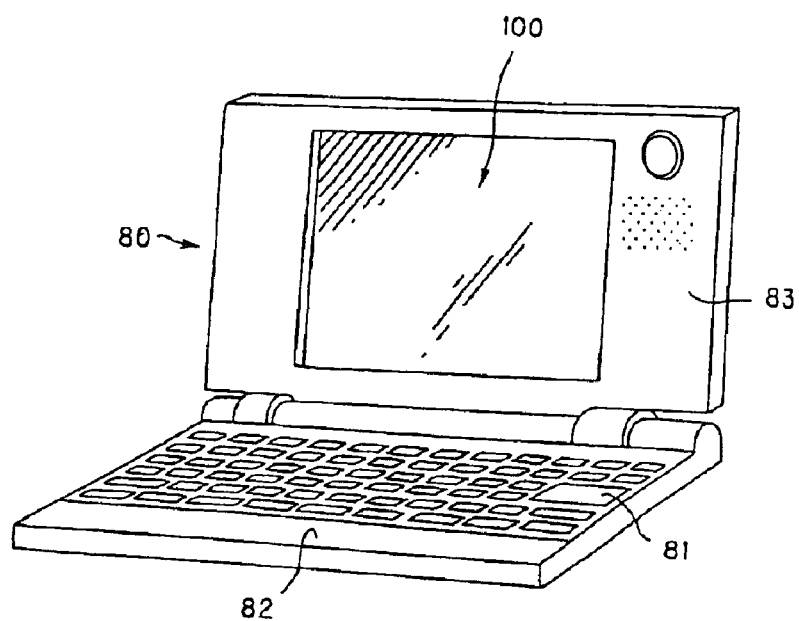
FIG. 19 is a schematic perspective view showing a personal computer of mobile type, which is an example of an electronic equipment employing an electro-optic device according to the present invention.

FIG. 19 shows a personal computer of mobile type which is one exemplary embodiment of an electronic equipment according to the present invention. The personal computer 80 has a body portion 82 including a keyboard 81, and a liquid-crystal display unit 83. The liquid-crystal display unit 83 is constructed including the electro-optic device 100 stated above.

Figure 20:
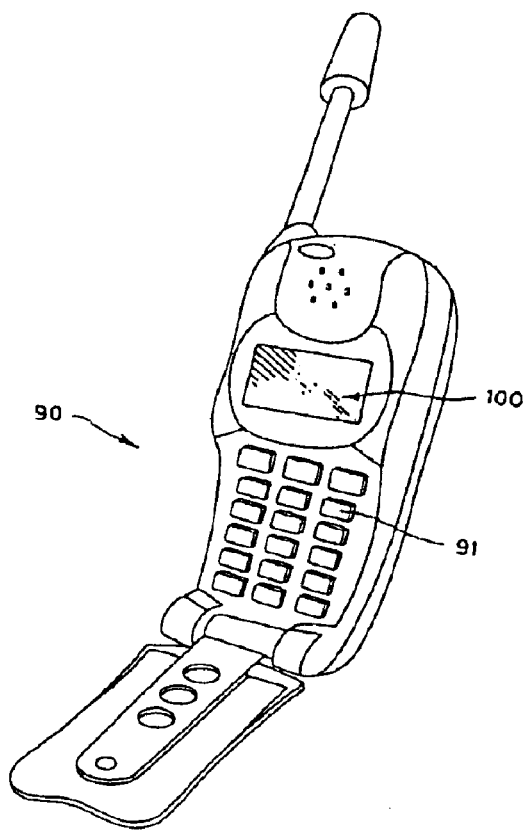
FIG. 20 is a schematic perspective view of a portable telephone set, which is another example of an electronic equipment employing an electro-optic device according to the present invention.

FIG. 20 shows a portable telephone set which is another electronic equipment. The portable telephone set 90 includes a plurality of operating buttons 91, and a display unit constructed of the electro-optic device 100 stated above.

The present invention is not restricted to the foregoing exemplary embodiments, but it is properly alterable within a scope not departing from the subject matter or idea of the invention read from the claims and the whole specification, and a color filter substrate as well as a method of manufacturing the same, an electro-optic device and an electronic equipment in which such alterations are included shall also be covered within the technical scope of the present invention.

What is claimed is:

1. A color filter substrate, comprising:

a substrate;

pixel portions arrayed in a matrix on the substrate;

a first region and a second region formed adjacent to each other within each of the pixel portions;

a first colored layer formed at parts in the first region; and a second colored layer formed in the second region, and formed at parts in the first region except a formation region of the first colored layer.

2. The color filter substrate as defined in claim 1, the first colored layer being formed in a matrix-like pattern within the first region.

3. The color filter substrate as defined in claim 1, a predetermined distance being set between an outer edge of the region in which the first colored layer is formed and an inner edge of the other region.

4. The color filter substrate as defined in claim 1, a thickness of the first colored layer and a thickness of the second colored layer being the same.

5. The color filter substrate as defined in claim 1, the first colored layer and the second colored layer being made of materials which have spectral transmission factors that are different from each other.

6. An electro-optic device, comprising:

the color filter substrate of claim 1;

another substrate arranged in opposition to the color filter substrate; and an electro-optic substance arranged between the color filter substrate and the other substrate.

7. A method of manufacturing a color filter substrate having pixel portions arrayed in a matrix on a substrate, comprising:

forming a first region and a second region adjacent to each other within each of the pixel portions;

forming a first colored layer at parts in the first region; and forming a second colored layer in the second region and parts of the first region except a formation region of the first colored layer.

8. The method of manufacturing a color filter substrate as defined in claim 7, the forming the first colored layer further including:

forming a first raw material film on a whole surface of the each pixel portion;

forming a resist film on the first raw material film;

subjecting the resist film to exposure to light for a predetermined pattern, and developing an exposed region of the resist film; and etching both the resist film and the first raw material film.

9. The method of manufacturing a color filter substrate as defined in claim 7, the forming the second colored layer further including:

forming a second raw material film having a thickness greater than a thickness of the second colored layer to be finally formed; and baking the second raw material film.

10. The method of manufacturing a color filter substrate as defined in claim 8, the predetermined pattern including a matrix-like pattern at parts corresponding to the first region.

11. The method of manufacturing a color filter substrate as defined in claim 10, a total of areas of individual shapes constituting the matrix-like pattern being smaller than an area of a part within the matrix-like pattern except the individual shapes.

12. The method of manufacturing a color filter substrate as defined in claim 7, a predetermined distance being set between an outer edge of a region where the first colored layer is formed and an inner edge of the first region.

13. An electronic equipment, comprising:

the electro-optic device of claim 6.

* * * * *